US011318444B2

(12) United States Patent
Long et al.

(10) Patent No.: US 11,318,444 B2
(45) Date of Patent: May 3, 2022

(54) DESULFURIZATION CATALYST, ITS PRODUCTION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jun Long, Beijing (CN); Shuandi Hou, Beijing (CN); Wei Lin, Beijing (CN); Ye Song, Beijing (CN); Huiping Tian, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 0 days.

(21) Appl. No.: 16/760,676

(22) PCT Filed: Oct. 31, 2017

(86) PCT No.: PCT/CN2017/108464
§ 371 (c)(1),
(2) Date: Apr. 30, 2020

(87) PCT Pub. No.: WO2019/084741
PCT Pub. Date: May 9, 2019

(65) Prior Publication Data
US 2020/0282381 A1    Sep. 10, 2020

(51) Int. Cl.
| | | |
|---|---|---|
| *B01J 27/24* | (2006.01) |
| *B01J 23/06* | (2006.01) |
| *B01J 6/00* | (2006.01) |
| *B01J 21/06* | (2006.01) |
| *B01J 21/16* | (2006.01) |
| *B01J 23/755* | (2006.01) |
| *B01J 29/04* | (2006.01) |
| *B01J 29/08* | (2006.01) |
| *B01J 35/00* | (2006.01) |
| *B01J 37/00* | (2006.01) |
| *B01J 37/08* | (2006.01) |
| *B01J 37/16* | (2006.01) |
| *C10G 45/04* | (2006.01) |

(Continued)

(52) U.S. Cl.
CPC ............... *B01J 23/06* (2013.01); *B01J 6/001* (2013.01); *B01J 21/063* (2013.01); *B01J 21/066* (2013.01); *B01J 21/16* (2013.01); *B01J 23/755* (2013.01); *B01J 27/24* (2013.01); *B01J 29/049* (2013.01); *B01J 29/08* (2013.01); *B01J 29/40* (2013.01); *B01J 29/7007* (2013.01); *B01J 35/0053* (2013.01); *B01J 37/0045* (2013.01); *B01J 37/08* (2013.01); *B01J 37/16* (2013.01); *C10G 45/04* (2013.01); *C10G 45/06* (2013.01); *C10G 45/10* (2013.01); *C10G 2300/202* (2013.01); *C10G 2300/70* (2013.01)

(58) Field of Classification Search
CPC ... B01J 6/001; B01J 21/02; B01J 21/04; B01J 21/06; B01J 21/16; B01J 21/18; B01J 21/063; B01J 21/066; B01J 23/06; B01J 23/04; B01J 23/10; B01J 23/18; B01J 23/175; B01J 23/80; B01J 23/83; B01J 23/84; B01J 23/8435; B01J 23/78; B01J 27/20; B01J 27/22; B01J 27/24; B01J 27/224; B01J 27/228; B01J 35/006; B01J 35/1019; B01J 35/0053; B01J 37/0045; B01J 37/0201; B01J 37/08; B01J 37/088; B01J 37/18; B01J 37/12; B01J 37/16; B01J 29/049; B01J 29/08; B01J 29/40; B01J 29/7007; B01J 29/85; C10G 45/04; C10G 2300/70; C10G 2300/202; C10G 45/06; C10G 45/10; C10G 45/12
USPC ....... 502/174, 177, 179, 200, 201, 202, 232, 502/240, 242, 243, 246, 259, 260, 302, 502/303, 304, 344, 349, 353, 354, 60, 502/214, 77, 79, 81; 208/208 R, 226, 208/230, 236, 243, 244, 245, 247, 249
See application file for complete search history.

(56) References Cited

U.S. PATENT DOCUMENTS

| | | | | |
|---|---|---|---|---|
| 2012/0317872 | A1* | 12/2012 | Powell | ....................... C10L 5/44 44/307 |
| 2013/0199968 | A1* | 8/2013 | Bourane | ................ B01J 35/026 208/212 |
| 2018/0029023 | A1* | 2/2018 | Koseoglu | ................. B01J 29/46 |

FOREIGN PATENT DOCUMENTS

| | | |
|---|---|---|
| CN | 1355727 A | 6/2002 |
| CN | 1208124 C | 6/2005 |

(Continued)

OTHER PUBLICATIONS

Machine translation, claims CN 104888762, Sep. 9, 2012.*

(Continued)

*Primary Examiner* — Elizabeth D Wood
(74) *Attorney, Agent, or Firm* — Novick, Kim & Lee, PLLC; Allen Xue

(57) ABSTRACT

A desulfurization catalyst includes at least: 1) a sulfur-storing metal oxide, 2) an inorganic binder, 3) a wear-resistant component, and 4) an active metal component. The sulfur-storing metal is one or more of a metal of Group IIB of the periodic table, a metal of Group VB of the periodic table, and a metal of Group VIB of the periodic table, e.g., zinc. The desulfurization catalyst has a good stability and a high desulfurization activity.

20 Claims, 2 Drawing Sheets

(51) Int. Cl.
*B01J 29/70* (2006.01)
*B01J 29/40* (2006.01)
*C10G 45/06* (2006.01)
*C10G 45/10* (2006.01)

(56) References Cited

FOREIGN PATENT DOCUMENTS

| | | |
|---|---|---|
| CN | 104888762 A | 9/2015 |
| CN | 105251523 A | 1/2016 |
| CN | 105854930 A | 8/2016 |
| CN | 106563410 A | 4/2017 |
| CN | 106955735 A | 7/2017 |
| CN | 109722302 A | 5/2019 |
| EA | 010112 B1 | 6/2008 |
| EP | 1224970 A1 | 7/2002 |
| EP | 1309528 A4 | 9/2004 |
| EP | 1309528 A | 8/2016 |

OTHER PUBLICATIONS

Machine translation, description CN 104888762, Sep. 9, 2012.*
Machine translation, claims CN 105854930, Aug. 17, 2016.*
Machine translation, description CN 105854930, Aug. 17, 2016.*
Machine translation WO 2018/216555, Nov. 29, 2018.*
Machine translation WO 2015/083704, Nov. 6, 2015.*
Kelina et al., "Chemical Stability of a Composite Material Based on Silicon and Boron Nitrides", Refractories and Industrial Ceramics, vol. 39, Nos. 11-12, 1998.*
Ji, Haiyan et al.; "Deep oxidative desulfurization with a microporous hexagonal boron nitride confining phosphotungstic acid catalyst", Journal of Molecular Catalysis A: Chemical, vol. 423, Nov. 2016, pp. 207-215.
Kolesnikov, I. M et al.; Solid Catalysts, Their Structure, Composition and Catalytic Activity; State Unitary Enterprise Publishing House "Oil and Gas" Russian State University of Oil and Gas, Moscow, 2000, 372 pages in total.
Yan et al.; "Desulfurization of Model Oil by Selective Adsorption over Porous Boron Nitride Fibers with Tailored Microstructures", Scientific Reports, Jun. 12, 2017; 7:3297; pp. 1-8.

* cited by examiner

DESULFURIZATION CATALYST, ITS PRODUCTION AND APPLICATION THEREOF

TECHNICAL FIELD

The present application relates to a desulfurization catalyst, particularly to a desulfurization catalyst useful for the desulfurization of hydrocarbon oils. The present application also relates to a method for the preparation of the desulfurization catalyst, and use of the desulfurization catalyst in the desulfurization of hydrocarbon oils.

BACKGROUND ART

With the increasing scarcity of crude oil resources, maximum production of light products from limited resources has become a goal of oil refining technology developers. On the other hand, with the increasing environmental protection requirements, environmental regulations are becoming stricter. By way of example, the currently implemented Chinese gasoline quality standard GB17930-2013 requires that the sulfur content in gasoline must be less than 10 ppm from Jan. 1, 2017. For this reason, many oil refining companies have been working on developing new clean product production technologies, and particularly new desulfurization catalysts.

Chinese patent application publication No. CN1355727A discloses a particulate catalyst composition comprising a mixture of zinc oxide, silicon oxide, aluminum oxide and nickel present in a substantially reduced state, which is used for the desulfurization of a cracked-gasoline or diesel fuel feedstream in a desulfurization zone by a method comprising: contacting the catalyst with the feedstream in the desulfurization zone, separating the resulted low sulfur-containing stream from the sulfided catalyst, regenerating and activating the separated catalyst, and recycling it to the desulfurization zone.

Chinese patent application publication No. CN1208124C discloses the preparation of a catalyst composition useful for the removal of sulfur and sulfur compounds such as hydrogen sulfide, carbonyl sulfide and mercaptans from cracked gasoline and diesel fuel by impregnating a catalyst support comprising zinc oxide, expanded perlite and aluminum oxide with a promoter metal such as nickel and/or cobalt and then reducing the promoter metal. Ground expanded perlite is used in the formation of the catalyst support to provide a support, in which the contents of zinc oxide and binder are adjusted to provide abrasion resistance for the catalyst and to extend the useful life of the catalyst.

SUMMARY OF THE INVENTION

After assiduous research, the inventors of the present application have developed a novel desulfurization catalyst, and accomplished the present invention based thereon.

In particular, the present application relates to the following aspects.

1. A desulfurization catalyst comprising:
   1) a sulfur-storing metal oxide, wherein the sulfur-storing metal is one or more selected from the group consisting of a metal of Group JIB of the periodic table, a metal of Group VB of the periodic table, and a metal of Group VIB of the periodic table, preferably one or more selected from the group consisting of zinc, cadmium, niobium, tantalum, chromium, molybdenum, tungsten, and vanadium, more preferably one or more selected from the group consisting of zinc, molybdenum, and vanadium, more preferably zinc;
   2) an inorganic binder, wherein the inorganic binder is preferably one or more selected from the group consisting of refractory inorganic oxides, more preferably one or more selected from the group consisting of aluminum oxide, silicon oxide, zirconium oxide, titanium oxide and tin oxide, more preferably one or more selected from the group consisting of aluminum oxide, zirconium oxide, titanium oxide and tin oxide;
   3) a wear-resistant component that is boron nitride (preferably hexagonal phase boron nitride) or a combination of the boron nitride with one or more compounds (other than boron nitride) selected from the group consisting of oxides, nitrides, carbides, oxynitrides, carbonitrides, oxycarbides and oxycarbonitrides of an element A, wherein the element A is one or more selected from the group consisting of a metal element of Group IVB of the periodic table, boron, aluminum and silicon, more preferably one or more selected from the group consisting of boron carbide, silicon nitride, silicon carbide, silica, aluminum nitride, aluminum carbide, aluminum oxide, zirconium nitride, zirconium carbide, zirconium oxide, titanium nitride, titanium carbide and titanium oxide, preferably boron nitride, more preferably hexagonal phase boron nitride;
   4) an active metal component that is one or more selected from the group consisting of a metal element of Group VIII of the periodic table, an oxide of an iron group element of the periodic table, a metal element of Group IB of the periodic table, an oxide of a metal element of Group IB of the periodic table, a metal element of Group VIIB of the periodic table and an oxide of a metal element of Group VIIB of the periodic table, preferably one or more selected from the group consisting of iron, iron oxides, cobalt, cobalt oxides, nickel, nickel oxides, copper, copper oxides, manganese and manganese oxides, more preferably one or more selected from the group consisting of nickel, nickel oxides, cobalt and cobalt oxides, more preferably nickel, nickel oxides or a combination thereof; and
   5) optionally, an acidic porous material, preferably one or more selected from the group consisting of molecular sieves and pillared clays (preferably one or more selected from the group consisting of rectorite, tarasovite, bentonite, montmorillonite and smectite), more preferably one or more selected from the group consisting of molecular sieves having an IMF structure (preferably one or more selected from the group consisting of HIM-5 molecular sieves, IM-5 molecular sieves, P—IM-5 molecular sieves and P—Si—IM-5 molecular sieves), molecular sieves having a FAU structure (preferably one or more selected from the group consisting of X molecular sieves, Y molecular sieves, USY molecular sieves, REUSY molecular sieves, REHY molecular sieves, REY molecular sieves, PUSY molecular sieves, PREHY molecular sieves and PREY molecular sieves), molecular sieves having a BEA structure (preferably one or more selected from the group consisting of β molecular sieves), molecular sieves having a SAFO structure (preferably one or more selected from the group consisting of SAPO-5 molecular sieves, SAPO-11 molecular sieves, SAPO-31 molecular sieves, SAPO-34 molecular sieves and SAPO-20 molecular sieves) and molecular sieves having a MFI structure (preferably one or more selected from the group consisting of ZSM-5 molecular sieves, ZRP-1 molecular sieves and ZSP-3 molecular sieves).

2. The desulfurization catalyst of any of the preceding aspects, wherein the inorganic binder and/or the wear-resistant component is free of silicon.

3. The desulfurization catalyst according to any one of the preceding aspects, wherein the boron nitride has a specific surface area of 100-300 m$^2$/g, preferably 120-260 m$^2$/g.

4. The desulfurization catalyst of any of the preceding aspects, wherein the catalyst comprises:

10-80 wt % of the sulfur-storing metal oxide (calculated on the basis of sulfur-storing metal oxide), 3-35 wt % of the inorganic binder (calculated on the basis of oxide), 5-40 wt % of the wear-resistant component (on a dry basis), 5-30 wt % of the active metal component (calculated on the basis of metal element), and 0-20 wt % of the acidic porous material (on a dry basis), relative to the total weight of the desulfurization catalyst, or relative to the total weight (as 100 wt %) of the components 1) to 5), preferably 25-70 wt % of the sulfur-storing metal oxide (calculated on the basis of sulfur-storing metal oxide), 6-25 wt % of the inorganic binder (calculated on the basis of oxide), 10-30 wt % of the wear-resistant component (on a dry basis), 8-25 wt % of the active metal component (calculated on the basis of metal element), and 1-15 wt % of the acidic porous material (on a dry basis), relative to the total weight of the desulfurization catalyst, or relative to the total weight (as 100 wt %) of the components 1) to 5), more preferably 40-60 wt % of the sulfur-storing metal oxide (calculated on the basis of sulfur-storing metal oxide), 8-15 wt % of the inorganic binder (calculated on the basis of oxide), 12-25 wt % of the wear-resistant component (on a dry basis), 12-20 wt % of the active metal component (calculated on the basis of metal element), and 2-10 wt % of the acidic porous material (on a dry basis), relative to total weight of the desulfurization catalyst, or relative to the total weight (as 100 wt %) of the components 1) to 5).

5. The desulfurization catalyst according to any one of the preceding aspects, wherein the composition of the catalyst is a post-calcination composition measured after calcination at 650° C. for 4 hours in an air atmosphere.

6. The desulfurization catalyst of any of the preceding aspects, wherein the catalyst further comprises at least one additive, preferably the additive is one or more selected from the group consisting of alkali metal oxides (preferably one or more selected from the group consisting of sodium oxide and potassium oxide), clays (preferably one or more selected from the group consisting of kaolin, glagerite, montmorillonite, diatomite, halloysite, metahalloysite, saponite, rectorite, sepiolite, attapulgite, hydrotalcite and bentonite), rare earth metal oxides (the rare earth metal being one or more selected from the group consisting of La, Ce, Pr, Nd, Pm, Sm, Eu, Gd, Tb, Dy, Ho, Er, Tm, Yb and Lu, preferably one or more selected from the group consisting of La, Pr and Nd), and antimony oxide.

7. A method for producing a desulfurization catalyst, comprising the steps of:

(1) contacting at least the following components with each other to obtain a catalyst precursor, 1) a sulfur-storing metal oxide and/or a precursor thereof, wherein the sulfur-storing metal is one or more selected from the group consisting of a metal of Group IIB of the periodic table, a metal of Group VB of the periodic table, and a metal of Group VIB of the periodic table, preferably one or more selected from the group consisting of zinc, cadmium, niobium, tantalum, chromium, molybdenum, tungsten and vanadium, more preferably one or more selected from the group consisting of zinc, molybdenum and vanadium, more preferably zinc, 2) an inorganic binder and/or a precursor thereof, wherein the inorganic binder is preferably one or more selected from the group consisting of refractory inorganic oxides, more preferably one or more selected from the group consisting of aluminum oxide, silicon oxide, zirconium oxide, titanium oxide and tin oxide, more preferably one or more selected from the group consisting of aluminum oxide, zirconium oxide, titanium oxide and tin oxide, 3) a wear-resistant component and/or a precursor thereof, wherein the wear-resistant component is boron nitride (preferably hexagonal phase boron nitride) or a combination of the boron nitride with one or more compounds (other than boron nitride) selected from the group consisting of oxides, nitrides, carbides, oxynitrides, carbonitrides, oxycarbides and oxycarbonitrides of an element A, wherein the element A is one or more selected from the group consisting of a metal element of Group IVB of the periodic table, boron, aluminum and silicon, more preferably one or more selected from the group consisting of boron carbide, silicon nitride, silicon carbide, silica, aluminum nitride, aluminum carbide, aluminum oxide, zirconium nitride, zirconium carbide, zirconium oxide, titanium nitride, titanium carbide and titanium oxide, preferably boron nitride, more preferably hexagonal phase boron nitride, 4) an active metal component and/or a precursor thereof, wherein the active metal component is one or more selected from the group consisting of a metal element of Group VIII of the periodic table, an oxide of an iron group element of the periodic table, a metal element of Group IB of the periodic table, an oxide of a metal element of Group IB of the periodic table, a metal element of Group VIIB of the periodic table and an oxide of a metal element of Group VIIB of the periodic table, preferably one or more selected from the group consisting of iron, iron oxides, cobalt, cobalt oxides, nickel, nickel oxides, copper, copper oxides, manganese and manganese oxides, more preferably one or more selected from the group consisting of nickel, nickel oxides, cobalt and cobalt oxides, more preferably nickel, nickel oxides or a combination thereof, 5) optionally, an acidic porous material and/or a precursor thereof, preferably, the acidic porous material is one or more selected from the group consisting of molecular sieves and pillared clays (preferably one or more selected from the group consisting of rectorite, tarasovite, bentonite, montmorillonite and smectite), more preferably one or more selected from the group consisting of molecular sieves having an IMF structure (preferably one or more selected from the group consisting of HIM-5 molecular sieves, IM-5 molecular sieves, P—IM-5 molecular sieves and P—Si—IM-5 molecular sieves), molecular sieves having a FAU structure (preferably one or more selected from the group consisting of X molecular sieves, Y molecular sieves, USY molecular sieves, REUSY molecular sieves, REHY molecular sieves, REY molecular sieves, PUSY molecular sieves, PREHY molecular sieves and PREY molecular sieves), molecular sieves having a BEA structure (preferably one or more selected from the group consisting of β molecular sieves), molecular sieves having a SAFO structure (preferably one or more selected from the group consisting of SAPO-5 molecular sieves, SAPO-11 molecular sieves, SAPO-31 molecular sieves, SAPO-34 molecular sieves and SAPO-20 molecular sieves) and molecular sieves having a MFI structure (preferably one or more selected from the group consisting of ZSM-5 molecular sieves, ZRP-1 molecular sieves and ZSP-3 molecular sieves), and 6) a contact medium, that is preferably water and/or an acidic liquid (preferably an acid or an aqueous acid solution), (2) optionally, calcining the catalyst precursor to obtain a desulfurization catalyst, and (3) optionally, reducing the desulfurization catalyst.

8. The method of any of the preceding aspects, wherein the step (1) further comprises the steps of:

(1-1) contacting the component 1), the component 2), the component 3), optionally the component 5) and the component 6) with each other to obtain a support slurry, (1-2) calcining the support slurry, optionally after drying, to obtain a catalyst support, and (1-3) contacting the component 4) with the catalyst support to obtain the catalyst precursor.

9. The method of any of the preceding aspects, wherein the components are charged at the following relative ratios by weight:

the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water is (10-80):(3-35):(5-40):(5-30):(0-20):(50-500), and the ratio of the acid:the component 2) (calculated on the basis of oxide) is (0.01-1.0):1, preferably, the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water is (25-70):(6-25):(10-30):(8-25):(1-15):(100-400), and the ratio of the acid:the component 2) (calculated on the basis of oxide) is (0.02-0.9):1, more preferably, the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water is (40-60):(8-15):(12-25):(12-20):(2-10):(150-300), and the ratio of the acid:the component 2) (calculated on the basis of oxide) is (0.03-0.8):1.

10. The method of any of the preceding aspects, wherein conditions for the calcination include: a calcining temperature of 300-800° C., preferably 450-750° C., a calcining time of 0.5 hours or more, preferably 1-3 hours, and an oxygen-containing atmosphere; or, conditions for the reduction include: a reduction temperature of 300-600° C., preferably 400-500° C., a reduction time of 0.5-6 hours, preferably 1-3 hours, and a hydrogen-containing atmosphere (preferably having a hydrogen content of 10-60 vol. %).

11. The method of any of the preceding aspects, wherein conditions for the drying may include: a drying temperature of 25-400° C., preferably 100-350° C., and a drying time of 0.5 hours or more, preferably 2-20 hours; or, conditions for the calcining may include: a calcining temperature of 400-700° C., preferably 450-650° C., a calcining time of 0.5 hours or more, preferably 0.5-10 hours, and an oxygen-containing atmosphere.

12. The method of any of the preceding aspects, further comprising the step of introducing an additive and/or a precursor thereof, preferably the additive is one or more selected from the group consisting of alkali metal oxides (preferably one or more selected from the group consisting of sodium oxide and potassium oxide), clays (preferably one or more selected from the group consisting of kaolin, glagerite, montmorillonite, diatomite, halloysite, metahalloysite, saponite, rectorite, sepiolite, attapulgite, hydrotalcite and bentonite), rare earth metal oxides (the rare earth metal being one or more selected from the group consisting of La, Ce, Pr, Nd, Pm, Sm, Eu, Gd, Tb, Dy, Ho, Er, Tm, Yb and Lu, preferably one or more selected from the group consisting of La, Pr and Nd), and antimony oxide.

13. A desulfurization method comprising a step of contacting a sulfur-containing hydrocarbon oil (preferably crude oil or petroleum fraction having a boiling range of no more than 450° C., particularly a petroleum fraction having a boiling range of from −42.1° C. to 350° C., more preferably one or more selected from the group consisting of liquefied petroleum gas, cracked gasoline, and diesel fuel) with a desulfurization catalyst according to any one of the preceding aspects or a desulfurization catalyst obtained by a method according to any one of the preceding aspects under desulfurization conditions.

14. The desulfurization method of any of the preceding aspects, wherein the desulfurization conditions include: a hydrogen atmosphere, a reaction temperature of 350-500° C., preferably 400-450° C., a reaction pressure of 0.5-4 MPa (absolute pressure), preferably 1.0-2.0 MPa (absolute pressure), a hydrogen-to-oil ratio by volume of 0.1-0.5, preferably 0.15-0.4, and a mass space velocity of 2-6 $h^{-1}$, preferably 2.5-5 $h^{-1}$.

Technical Effects

According to the present application, at least one of the following technical effects, or preferably, at least two or more of the following technical effects can be achieved at the same time.

(1) Compared with the desulfurization catalyst in the prior art, the desulfurization catalyst according to the present application has better stability and higher desulfurization activity, so that sulfur in the hydrocarbon oil can be more effectively transferred to the desulfurization catalyst during the desulfurization process of the hydrocarbon oil, and a hydrocarbon oil with lower sulfur content can be obtained.

(2) Compared with the desulfurization catalyst in the prior art, the desulfurization catalyst according to the present application has better abrasion resistance, so that the loss of the catalyst during the desulfurization process can be reduced, the service life of the desulfurization catalyst can be prolonged, the sorbent consumption during desulfurization can be reduced, and the operation cost of the desulfurization process can be lowered.

(3) When the desulfurization catalyst according to the present application is used for the desulfurization of gasoline, the octane number of the gasoline can be kept to a maximum extent.

DETAILED DESCRIPTION OF THE INVENTION

Figure 1:
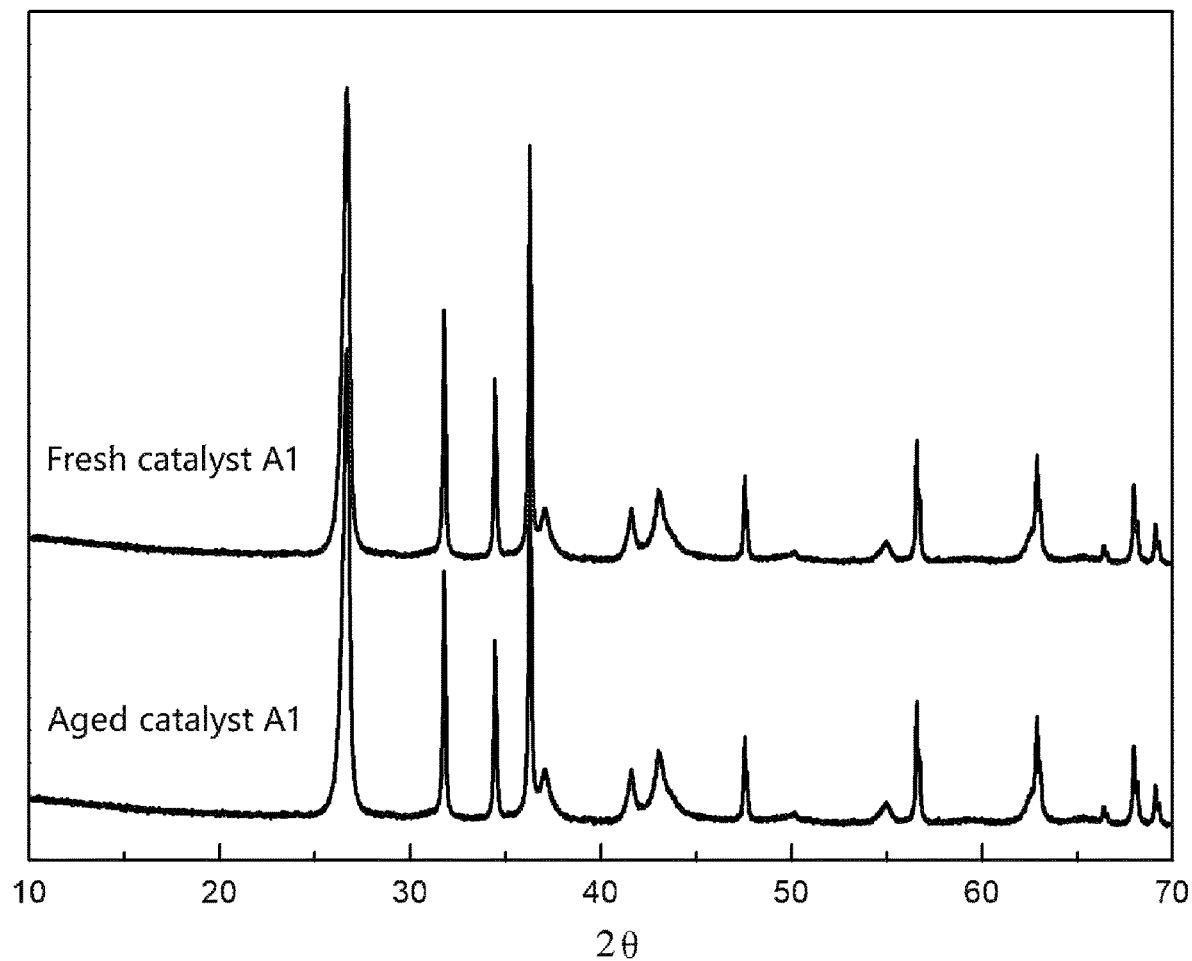
FIG. 1 is an XRD pattern of the desulfurization catalyst A1 obtained in Example 1 before and after hydrothermal aging.

The embodiments of the present application will be described in details hereinbelow, but it should be noted that the scope of the present application is not limited by the embodiments, but is defined by the appended claims.

The endpoints of the numerical ranges and any values disclosed herein are not limited to the exact ranges or values recited, but should be understood to encompass the values close to those ranges or values. For numerical ranges, the endpoints of the ranges, the endpoints and any individual point within the ranges, and the individual points themselves may be combined with each other to give one or more new numerical ranges, and these numerical ranges should be considered as specifically disclosed herein.

All publications, patent applications, patents, and other references mentioned herein are hereby incorporated by reference in their entirety. Unless defined otherwise, all technical and scientific terms used herein have the same meaning as commonly understood by one of ordinary skill in the art. In case of conflict, the description herein, including definitions, will control.

In the context of the present application, where a material, substance, method, step, apparatus, or component is modified with the wording "conventional in the art", "known in the art", or the like, it should be understood that the subject modified by the wording includes not only those conventionally used or known in the art before the filing of the present application, but also those not currently used or known but would be acknowledged in the art as being suitable for similar purposes.

In the context of the present application, the term "precursor(s)" should be understood in the sense customary in the chemical industry, unless otherwise stated. By way of example, the term generally means a material that can be converted into a targeted material upon drying or calcining. Here, conditions for the calcining may include: a calcining temperature of 300-800° C., preferably 450-750° C., a calcining pressure of normal pressure (101325 Pa), a calcining time of 0.5 h or more, preferably 1-3 h, and an oxygen-containing atmosphere. Alternatively, conditions for the drying may include: a drying temperature of 25-400° C., preferably 100-350° C., a drying pressure of normal pressure (101325 Pa), a drying time of 0.5 h or more, preferably 2-20 h, and the presence of flowing air.

In the context of the present application, where the operating temperature and pressure of a certain step or treatment are not explicitly described, it generally means that the step or treatment is not particularly limited with respect to the temperature and pressure, and can be freely selected by a person skilled in the art according to the practical circumstances, unless such interpretation is not conformable to the conventional knowledge of a person skilled in the art. In addition, from the viewpoint of easy processing, this also means that the step or treatment can be usually carried out at normal temperature (25° C.) and normal pressure (101325 Pa).

In the context of the present application, the expression "oxygen-containing gas" or "oxygen-containing atmosphere" generally means that the oxygen content is 10% by volume or more, preferably 20% by volume or more, unless otherwise stated.

In the context of the present application, the term "hydrocarbon oil" should be understood in the sense customary in the field of fuel chemistry. By way of example, the term generally means hydrocarbons or hydrocarbon mixtures used as feedstocks or produced as products in the fuel chemical industry, particularly crude oil or petroleum fractions having a boiling range of no more than 450° C.

In the context of the present application, the term "crude oil" should be understood in the sense customary in the field of fuel chemistry. By way of example, the term generally means a petroleum fraction having a boiling range of no more than 450° C.

In the context of the present application, the term "liquefied petroleum gas" should be understood in the sense customary in the field of fuel chemistry. By way of example, the term generally refers to a colorless volatile liquid resulted from the liquefaction of natural gas, propane, propylene, butane, or butene mixtures under pressure and reduced temperature.

In the context of the present application, the term "cracked-gasoline" should be understood in the sense customary in the field of fuel chemistry. By way of example, the term generally refers to a mixture of hydrocarbons having a boiling range of 40° C. to 210° C. or any fraction thereof, typically the product from a thermal or catalytic process that cracks larger hydrocarbon molecules into smaller molecules. By way of example, suitable thermal cracking processes include, but are not limited to, coking, thermal cracking, visbreaking, and the like, or a combination thereof, and examples of suitable catalytic cracking processes include, but are not limited to, fluid catalytic cracking, heavy oil catalytic cracking, and the like, or a combination thereof. By way of example, the cracked-gasoline includes, but is not limited to, coker gasoline, thermally cracked gasoline, visbreaker gasoline, fluid catalytically cracked gasoline, and heavy oil cracked-gasoline, or a combination thereof. The cracked gasoline may be fractionated and/or hydrotreated beforehand according to the need.

In the context of the present application, the term "diesel fuel" should be understood in the sense customary in the fuel chemical industry. By way of example, the term generally refers to a mixture of hydrocarbons having a boiling range of 170° C. to 450° C. or any fraction thereof. By way of example, the diesel fuel includes, but is not limited to, light cycle oil, kerosene, straight-run diesel, hydrotreated diesel, and the like, or a combination thereof.

In the context of the present application, the term "sulfur" should be understood in the sense customary in the field of fuel chemistry. By way of example, the term generally refers to the sulfur element present in any form, particularly to the various sulfur compounds commonly found in hydrocarbon oils. By way of example, the sulfur compounds include, but are not limited to, carbonyl sulfide (COS), carbon disulfide ($CS_2$), thiol or other thiophenic compounds, and the like, especially thiophene, benzothiophene, alkylthiophene, alkylbenzothiophene, or alkyldibenzothiophene, or thiophenic compounds having a larger molecular weight.

In the context of the present application, the term "oxide" generally refers to an oxide of the target element that is the most stable one in air at normal temperature and pressure, unless otherwise stated. By way of example, silicon oxide generally refers to an oxide of silicon that is the most stable one in air at normal temperature and pressure, i.e., silica, and aluminum oxide generally refers to an oxide of aluminum that is the most stable one in air at normal temperature and pressure, i.e., alumina.

In the context of the present application, the values provided of the boiling point, boiling range (sometimes also referred to as distillation range), cutting point, end and initial boiling points or similar physical properties are all values measured at atmospheric pressure (101325 Pa).

In the context of the present application, conditions for the measurement of the XRD pattern include: a D5005 type X-ray diffractometer of Siemens, Cu target, Kα radiation, solid detector, tube voltage 40 kV and tube current 40 mA.

In the context of the present application, the measurement conditions of the BET method include: an ASAP2010 type adsorption instrument of Micromeritics, USA, and a liquid nitrogen temperature of −196° C. Before measurement, the sample is degassed at 300° C. under 1.3 Pa for 8 h, and the specific surface area is calculated in accordance with the BET method.

Unless otherwise stated, all percentages, parts, ratios, etc. mentioned herein are on weight basis, unless it is not conformable to the conventional knowledge of those skilled in the art.

It should be noted that two or more of the aspects (or embodiments) disclosed herein can be combined with each other as desired, and that the technical solution (e.g., methods or systems) resulted from such a combination constitutes a part of the original disclosure, and falls within the scope of the present application.

According to the present application, a desulfurization catalyst is first provided. Here, the desulfurization catalyst comprises at least: a component 1) of a sulfur-storing metal oxide, a component 2) of an inorganic binder, a component 3) of a wear-resistant component, and a component 4) of an active metal component.

According to an aspect of the present application, in the sulfur-storing metal oxide component 1), the sulfur-storing metal may be a metal of Group IIB of the periodic table, a metal of Group VB of the periodic table, and a metal of Group VIB of the periodic table, preferably zinc, cadmium, niobium, tantalum, chromium, molybdenum, tungsten, and vanadium, more preferably zinc, molybdenum, and vanadium, and still more preferably zinc. Specific examples of the sulfur-storing metal oxide include zinc oxide, cadmium oxide, vanadium oxide, niobium oxide, tantalum oxide, chromium oxide, molybdenum oxide, and tungsten oxide, preferably zinc oxide, molybdenum oxide, and vanadium oxide, and more preferably zinc oxide. These sulfur-storing metal oxides may be used singly or in a combination of two or more thereof at any ratio.

According to an aspect of the present application, as the inorganic binder component 2), any inorganic materials that are conventionally used in the chemical industry for the production of catalysts and can exert a binding function can be used, and particularly, refractory inorganic oxides may be mentioned. Specific examples of the refractory inorganic oxides include aluminum oxide, silicon oxide, zirconium oxide, titanium oxide and tin oxide, and particularly, aluminum oxide, zirconium oxide, titanium oxide and tin oxide. These inorganic binders or refractory inorganic oxides may be used singly or in a combination of two or more thereof at any ratio.

According to an aspect of the present application, aluminum oxide as an inorganic binder may be present in the desulfurization catalyst in the form of aluminum oxide, a precursor thereof, or a mixture of both, depending on the method for the production of the desulfurization catalyst. For this reason, as the aluminum oxide, besides aluminum sesquioxide, SB powder, hydrated alumina, alumina sol, boehmite monohydrate (boehmite), pseudo-boehmite monohydrate (pseudo-boehmite), alumina trihydrate and amorphous aluminum hydroxide may also be mentioned, with SB powder, pseudo-boehmite and alumina sol being preferred. These aluminum oxides may be used singly or in a combination of two or more thereof at any ratio.

According to an aspect of the present application, titanium oxide as an inorganic binder may be present in the desulfurization catalyst in the form of titanium oxide, a precursor thereof, or a mixture of both, depending on the method for the production of the desulfurization catalyst. For this reason, as the titanium oxide, besides titanium dioxide, hydrated titanium dioxide, rutile type titanium dioxide, or anatase type titanium dioxide may also be mentioned. These titanium oxides may be used singly or in a combination of two or more thereof at any ratio.

According to an aspect of the present application, zirconium oxide as an inorganic binder may be present in the desulfurization catalyst in the form of zirconium oxide, a precursor thereof, or a mixture of both, depending on the method for the production of the desulfurization catalyst. For this reason, as the zirconium oxide, besides zirconia, hydrated zirconia may also be mentioned. These zirconium oxides may be used singly or in a combination of two or more thereof at any ratio.

According to an aspect of the present application, tin oxide as an inorganic binder may be present in the desulfurization catalyst in the form of tin oxide, a precursor thereof, or a mixture of both, depending on the method for the production of the desulfurization catalyst. For this reason, as the tin oxide, besides tin dioxide, hydrated tin oxide may also be mentioned. These tin oxides may be used singly or in a combination of two or more thereof at any ratio.

According to an aspect of the present application, as the wear-resistant component 3), boron nitride or a combination of boron nitride and a non-boron nitride type wear-resistant component may be used. Here, as the non-boron nitride type wear-resistant component, for example, any wear-resistant component conventionally used in the art for the production of desulfurization catalysts may be mentioned, and particularly, for example, oxides, nitrides, carbides, oxynitrides, carbonitrides, oxycarbides, or oxycarbonitrides of an element A may be mentioned, wherein the element A may be a metal element of Group IVB of the periodic table, boron, aluminum, or silicon. More specific examples of the non-boron nitride type wear-resistant component include boron carbide, silicon nitride, silicon carbide, silica, aluminum nitride, aluminum carbide, aluminum oxide, zirconium nitride, zirconium carbide, zirconium oxide, titanium nitride, titanium carbide, and titanium oxide. These non-boron nitride type wear-resistant components may be used singly or in a combination of two or more thereof at any ratio. In the above combination, the content of boron nitride is generally 5% by weight or more, preferably 10% by weight or more, and more preferably 50% by weight or more, based on the total weight of the combination, but is not limited thereto in some cases.

According to an aspect of the present application, as the wear-resistant component 3), boron nitride is preferable, and hexagonal phase boron nitride is more preferable. Here, the hexagonal phase boron nitride has a hexagonal crystal structure, and has a sheet structure and/or layered structure. Preferably, the boron nitride has a specific surface area (BET method) of generally 100-300 m$^2$/g, preferably 120-260 m$^2$/g. It is also preferred that the boron nitride has a nitrogen catalytic pore volume (BET method) of generally 0.05-0.1 cm$^3$/g.

According to the present application, the XRD pattern of the desulfurization catalyst shows characteristic peaks of boron nitride at 2θ of 27.2°±0.5°, 41.5°±0.5° and 50.3°±0.5°, with the most intense characteristic peak at 2θ of 41.5°±0.5°.

According to the present application, the desulfurization catalyst comprises boron nitride (especially hexagonal phase boron nitride) as a component, and because the boron nitride with the specific structure has high hydrothermal stability, the formation of catalytic inert substances such as zinc silicate and the like in the desulfurization catalyst can be effectively avoided during the desulfurization process of the hydrocarbon oil, so that better desulfurization activity and stability of the desulfurization catalyst can be obtained, sulfur in the hydrocarbon oil can be more effectively adsorbed onto the desulfurization catalyst during the desulfurization process of the hydrocarbon oil, and a hydrocarbon oil with lower sulfur content can be obtained. Particularly, the desulfurization catalyst has no characteristic peak of zinc silicate in its XRD pattern after hydrothermal aging at 2θ of 22.0, 25.54, 48.9 and 59.4. Here, conditions for the hydrothermal aging may include: a treatment temperature of 500-700° C., a steam partial pressure of 10-30 kPa, and a treatment time of 10-24 h. In addition, the desulfurization catalyst can thereby have better abrasion resistance, reduced loss during the desulfurization process, and prolonged service life, and is more suitable for a desulfurization process involving repeated reaction and regeneration.

According to an aspect of the present application, in order to prevent formation of a catalytically inert material such as zinc silicate in the desulfurization catalyst during desulfurization of hydrocarbon oil to a maximum extent, it is preferable that the inorganic binder is free of silicon. By way of example, the inorganic binder preferably does not comprise silica, a precursor thereof, or a mixture of both. Alternatively, it is preferred that the wear-resistant component is free of silicon. By way of example, as the wear-resistant component, it is preferable that the element A is absent or not silicon.

According to an aspect of the present application, as the active metal component 4), any active metal component conventionally known in the art for used in desulfurization catalysts may be mentioned, particularly, for example, a metal element of Group VIII of the periodic table, an oxide of an iron group element of the periodic table, a metal element of Group IB of the periodic table, an oxide of a metal element of Group IB of the periodic table, a metal element of Group VIIB of the periodic table, and an oxide of a metal element of Group VIIB of the periodic table may be mentioned, more particularly, iron, iron oxide, cobalt, cobalt oxide, nickel, nickel oxide, copper, copper oxide, manganese, and manganese oxide, even more particularly, nickel, nickel oxide, cobalt and cobalt oxide, and further more particularly, nickel, nickel oxide, or a combination thereof may be mentioned. In other words, the active metal component may be present as a simple metal, a metal oxide, or a mixture thereof. These active metal components may be used singly or in a combination of two or more thereof at any ratio.

According to an aspect of the present application, the desulfurization catalyst may further optionally comprise a component 5) of an acidic porous material, from the standpoint of maximizing octane number retention. Here, as the acidic porous material, for example, any acidic porous material conventionally known in the art may be mentioned, and particularly, for example, molecular sieves and pillared clays may be mentioned, with molecular sieves being preferred. These acidic porous materials may be used singly or in a combination of two or more thereof at any ratio.

According to an aspect of the present application, the pillared clay can be an interstratified mineral crystal composed of monolayers of two mineral clay ingredients arranged in a regularly alternating manner, with the basal spacing being not less than about 1.7 nm. Specific examples of the pillared clay include rectorite, tarasovite, bentonite, montmorillonite and smectite. These pillared clays may be used singly or in a combination of two or more thereof at any ratio.

According to an aspect of the present application, specific examples of the molecular sieves include molecular sieves having an IMF structure, molecular sieves having an FAU structure, molecular sieves having a BEA structure, molecular sieves having a SAFO structure, and molecular sieves having an MFI structure. These molecular sieves may be used singly or in a combination of two or more thereof at any ratio.

According to an aspect of the present application, a representative of the molecular sieve having an MFI structure is the ZSM-5 zeolite developed by Mobil Corporation of USA, which is characterized by a ten-membered ring structure of 5.1 Å×5.5 Å. Preferably, the molecular sieve having an MFI structure may be a ZSM-5 molecular sieve and/or a ZSM-5 molecular sieve modified with phosphorus or a transition metal. In addition, the molecular sieve having an MFI structure may have a $SiO_2:Al_2O_3$ molar ratio of generally 15-100:1, preferably 20-40:1. As the molecular sieve having an MFI structure, ZSM-5 molecular sieve, ZRP-1 molecular sieve and ZSP-3 molecular sieve are preferred. These molecular sieves may be used singly or in a combination of two or more thereof at any ratio.

According to an aspect of the present application, the molecular sieve having an IMF structure has a two-dimensional ten-membered ring pore structure, wherein the effective pore width is in the range of 0.48-0.56 nm, a limited pore also exists in the third dimension direction, the structure is composed of two-dimensional ten-membered ring pores and some cavities having three-dimensional characteristics, and the diameter of the pores is similar to that of ZSM-5. In addition, the molecular sieve having an IMF-_structure can also comprise a modified molecular sieve having an IMF structure. Here, methods for the modification may include a hydrothermal method, a chemical treatment method (such as an inorganic acid treatment method, a fluorosilicic acid Al—Si isomorphous substitution method, and a $SiCl_4$ gas phase method), or a combination of hydrothermal and chemical treatments. The modified molecular sieve may include, but is not limited to, HIM-5, IM-5, P—IM-5, P—Si—IM-5, etc. In addition, the molecular sieve having an IMF structure generally has a $SiO_2:Al_2O_3$ molar ratio of 20-70:1, preferably 30-50. As the molecular sieve having an IMF structure, HIM-5 molecular sieves, IM-5 molecular sieves, P—IM-5 molecular sieves and P—Si—IM-5 molecular sieves are preferred. These molecular sieves may be used singly or in a combination of two or more thereof at any ratio.

According to an aspect of the present application, the molecular sieve having a FAU structure can be a faujasite type molecular sieve, which has three-dimensional twelve-membered ring pores with a pore diameter of 7.4 Å×7.4 Å. The FAU structure molecular sieve is mainly X-type and Y-type molecular sieves, and generally, the molecular sieve having a $SiO_2/Al_2O_3$ molar ratio of 2.2-3.0 is X-type molecular sieve, and the molecular sieve having a $SiO_2/Al_2O_3$ molar ratio of more than 3.0 is Y-type molecular sieve. The framework structures of the X-type molecular sieve and the Y-type molecular sieve both belong to a hexagonal crystal system, with the space group structure being Fd3m, wherein the X-type molecular sieve has a lattice parameter a=24.86-25.02 Å, and the Y-type molecular sieve has a lattice parameter a=24.6-24.85 Å. In addition, the molecular sieve having a FAU structure also includes a modified molecular sieve having a FAU structure. Here, methods for the modification may include a hydrothermal method, a chemical treatment method (such as an inorganic acid treatment method, a fluorosilicic acid Al—Si isomorphous substitution method, and a $SiCl_4$ gas phase method), or a combination of hydrothermal and chemical treatments. The modified molecular sieve may include, but is not limited to, ultra-stable Y-type molecular sieves (USY), REUSY, REHY and REY molecular sieves containing a rare earth element, and phosphorus-containing PUSY, PREHY, PREY molecular sieves and the like. In addition, such molecular sieves have a $SiO_2:Al_2O_3$ molar ratio of 1-4:1, preferably 1.5-3:1. As the molecular sieve having a FAU structure, X molecular sieves, Y molecular sieves, USY molecular sieves, REUSY molecular sieves, REHY molecular sieves, REY molecular sieves, PUSY molecular sieves, PREHY molecular sieves, and PREY molecular sieves are preferred. These molecular sieves may be used singly or in a combination of two or more thereof at any ratio.

According to an aspect of the present application, the molecular sieve having a BEA structure is mainly a β molecular sieve having a formula ($Na_n[Al_nSi_{64-n}O_{128}]$, n<7) which is a mixed crystal formed by two structurally different, but closely related polymorphs A and B. Both of them have a twelve-membered ring three-dimensional pore system. Polymorph A forms a pair of enantiomers, with space groups of P4122 and P4322, lattice parameters a=12.5 Å, b=26.6 Å. Polymorph B belongs to the achiral space group C2/c, with lattice parameters a=17.6 Å, b=17.8 Å, c=14.4 Å, β=114.5°. The size of the twelve-membered ring pore of the molecular sieve having a BEA structure is 7.3 Å×6.0 Å <100 direction> and 5.6 Å×5.6 Å <001 direction>. The molecular sieve having a BEA structure generally has a $SiO_2:Al_2O_3$ molar ratio of 5-10:1, preferably 7-9:1. As the molecular sieve having a BEA structure, a β molecular sieve is preferred. These molecular sieves may be used singly or in a combination of two or more thereof at any ratio.

According to an aspect of the present application, the molecular sieve having a SAPO structure is a crystalline silicoaluminophosphate obtained by incorporating silicon into an aluminophosphate framework, and its framework is consisted of $PO_4^+$, $AlO_4^-$ and $SiO_2$ tetrahedra. Such molecular sieves may have 13 types of three-dimensional microporous framework structures, with a pore size of from 3 to 8 Å and a pore volume of from 0.18 to 0.48 $cm^3/g$. Specific examples of the molecular sieves having a SAPO structure include SAPO-5, SAPO-11, SAPO-31, SAPO-34, and SAPO-20. The pore sizes of the SAPO-5, SAPO-11, SAPO-31, SAPO-34, and SAPO-20 molecular sieves are respectively 8 Å (12-membered ring), 6 Å (10-membered ring), 7 Å (10-membered ring), 4.3 Å (8-membered ring), and 3 Å (6-membered ring), and the pore volumes are respectively 0.31, 0.18, 0.42, 0.42, and 0.40 $cm^3/g$. As the molecular sieve having a SAFO structure, SAPO-5 molecular sieves, SAPO-11 molecular sieves, SAPO-31 molecular sieves, SAPO-34 molecular sieves and SAPO-20 molecular sieves are preferred. These molecular sieves may be used singly or in a combination of two or more thereof at any ratio.

According to an aspect of the present application, the desulfurization catalyst may further optionally comprise an additive. Here, as the additive, for example, any additive conventionally known in the art for use in desulfurization catalysts may be mentioned, and particularly, for example, alkali metal oxides, clays, rare earth metal oxides, and antimony oxide ($Sb_2O_3$) may be mentioned. These additives may be used singly or in a combination of two or more thereof at any ratio.

According to an aspect of the present application, as the alkali metal oxide, sodium oxide and potassium oxide are preferred. These alkali metal oxides may be used singly or in a combination of two or more thereof at any ratio. When used, the alkali metal oxide (calculated on the basis of alkali metal oxide) is generally used in an amount of 0.1-5% by weight, relative to the total weight of the desulfurization catalyst, or relative to the total weight (as 100% by weight) of the components 1) to 5) and the additive.

According to an aspect of the present application, as the clay, for example, clay raw materials known to those skilled in the art may be mentioned, and kaolin, glagerite, montmorillonite, diatomite, halloysite, metahalloysite, saponite, rectorite, sepiolite, attapulgite, hydrotalcite and bentonite are preferred. These clays may be used singly or in a combination of two or more thereof at any ratio. When used, the clay is generally used in an amount (on a dry basis) of 1-10% by weight, relative to the total weight of the desulfurization catalyst, or relative to the total weight (as 100% by weight) of the components 1) to 5) and the additive.

According to an aspect of the present application, as the rare earth metal in the rare earth metal oxide, La, Ce, Pr, Nd, Pm, Sm, Eu, Gd, Tb, Dy, Ho, Er, Tm, Yb and Lu are preferred, and La, Pr and Nd are more preferred. These rare earth metals or rare earth metal oxides may be used singly or in a combination of two or more thereof at any ratio. When used, the rare earth metal oxide is generally used in an amount (calculated on the basis of rare earth metal oxide) of 1-5 wt. %, relative to the total weight of the desulfurization catalyst, or relative to the total weight (as 100 wt. %) of the components 1) to 5) and the additive.

According to an aspect of the present application, when used, the antimony oxide is generally used in an amount (calculated on the basis of $Sb_2O_3$) of 1-3% by weight, relative to the total weight of the desulfurization catalyst, or relative to the total weight (as 100% by weight) of the components 1) to 5) and the additive.

According to an aspect of the present application, the tap density (in accordance with the Chinese national standard GB/T21354-2008) of the desulfurization catalyst is generally 1.0-1.3 $cm^3/g$.

According to an aspect of the present application, the desulfurization catalyst generally has a specific surface area (BET method) of 25-35 $m^2/g$.

According to an aspect of the present application, the desulfurization catalyst comprises 10-80 wt % of the sulfur-storing metal oxide (calculated on the basis of sulfur-storing metal oxide), 3-35 wt % of the inorganic binder (calculated on the basis of oxide), 5-40 wt % of the wear-resistant component (on a dry basis), 5-30 wt % of the active metal component (calculated on the basis of metal element), and 0-20 wt % of the acidic porous material (on a dry basis), relative to the total weight of the desulfurization catalyst, or relative to the total weight (as 100 wt %) of the components 1) to 5).

According to an aspect of the present application, it is preferable that the desulfurization catalyst comprises 25-70 wt % of the sulfur-storing metal oxide (calculated on the basis of sulfur-storing metal oxide), 6-25 wt % of the inorganic binder (calculated on the basis of oxide), 10-30 wt % of the wear-resistant component (on a dry basis), 8-25 wt % of the active metal component (calculated on the basis of metal element), and 1-15 wt % of the acidic porous material (on a dry basis), relative to the total weight of the desulfurization catalyst, or relative to the total weight (as 100 wt %) of the components 1) to 5).

According to an aspect of the present application, it is preferable that the desulfurization catalyst comprises 40-60 wt % of the sulfur-storing metal oxide (calculated on the basis of sulfur-storing metal oxide), 8-15 wt % of the inorganic binder (calculated on the basis of oxide), 12-25 wt % of the wear-resistant component (on a dry basis), 12-20 wt % of the active metal component (calculated on the basis of metal element), and 2-10 wt % of the acidic porous material (on a dry basis), relative to the total weight of the desulfurization catalyst, or relative to the total weight (as 100 wt %) of the components 1) to 5).

According to the present application, the contents of the aforementioned components in the desulfurization catalyst can be determined according to the following method (hereinafter sometimes referred to as XRD measurement method):

a sample of the desulfurization catalyst is calcined at 650° C. for 4 hours in an air atmosphere and stored in a nitrogen atmosphere for future use. 1 g of the calcined catalyst sample is weighed and subjected to XRD characterization. The XRD pattern obtained is compared with the standard patterns of the inorganic crystal structure database, each component is identified, and the strongest characteristic peak of each component is further determined. Then, the peak area of the strongest characteristic peak of a certain component is divided by the sum of the peak areas of all the strongest characteristic peaks, and the ratio obtained is taken as the content of the component. Particularly, the content of the active metal component obtained by this measurement method is on the basis of metal oxide, which can be easily converted into the content on the basis of metal element.

According to the present application, the measurement of the content of each component in the desulfurization catalyst by the XRD method may also refer to Q/SH3360 215-2009, "Determination of chemical composition of S-Zorb adsorbent", which is incorporated herein by reference in its entirety.

According to an aspect of the present application, depending on the method for the production of the desulfurization catalyst, each component, including the aforementioned components 1) to 5) and the additive, may be present in the desulfurization catalyst in the material form as described hereinbefore (which may also be referred to as a final material form, such as an oxide), but may also be present as a precursor of the material form (such as a hydroxide, a hydrate, or a simple metal, etc.), or a combination thereof. It is known to those skilled in the art that the structures of such precursor forms vary widely, covering an extremely wide range, and thus cannot be fully predicted or generalized. Therefore, for easy understanding of the present application and for brevity, the present description only describes the final material form (such as oxide) of the components, while does not describe in detail any precursor form (such as hydroxide, hydrate or simple metal, etc.), or any combination of the final material form and the precursor form (such as combination of oxide and hydroxide, combination of oxide and hydrate or combination of oxide and simple metal, etc.) of the components. However, it can be understood that said precursor forms or said combinations are obviously variants of the present application that can be easily obtained by a person skilled in the art, and therefore such variants are also necessarily within the scope of the present application. For this purpose, in the context of the present application, the term "composition" may also be understood as a composition after calcining. The inventors of the present application have discovered through research that any of the precursor forms or combinations can be converted to the final material form by calcination. Here, conditions for the calcining may include: calcining at 650° C. for 4 hours under an air atmosphere.

According to an aspect of the present application, the desulfurization catalyst may be produced by a specific method. To this end, the present application also relates to a method for the production of the desulfurization catalyst.

According to an aspect of the present application, the method for the production of the desulfurization catalyst comprises the following steps (1) to (3), in which both step (2) and step (3) are optional steps.

Step (1): contacting at least components 1) to 6) with each other to obtain a catalyst precursor. Here, the step (1) is also referred to as a contacting step.

According to an aspect of the present application, in the contacting step, the components are contacted with each other in a contacting system (such as a reactor) to form a product mixture. Then, the product mixture is dried by any conventionally known means as necessary to remove volatile components such as water, whereby a catalyst precursor can be obtained. The catalyst precursor may also be referred to as a desulfurization catalyst before calcination, and is within the scope of the present application.

According to an aspect of the present application, in the contacting step, as a method for the drying, for example, airing, oven drying, and forced air drying may be mentioned. Conditions for the drying may include, for example, a drying temperature of 25-400° C., preferably 100-350° C., and a drying time of 0.5 hours or more, preferably 0.5-100 hours, and more preferably 2-20 hours.

According to an aspect of the present application, the step (1) may further comprise the following steps (1-1) to (1-3).

Step (1-1): contacting the component 1), the component 2), the component 3), optionally the component 5) and the component 6) with each other to obtain a support slurry.

According to an aspect of the present application, the step (1-1) may be performed as the step (1a) or as the step (1b), and is not particularly limited.

Step (1a): contacting the component 2) and the component 3) with the component 6), and then with the component 1) and optionally the component 5) to obtain a support slurry.

Step (1b): contacting the component 2) with the component 6), and then with the component 1), the component 3) and optionally the component 5) to obtain a support slurry.

Step (1-2): calcining the support slurry, optionally after drying, to obtain the catalyst support.

According to an aspect of the present application, the step (1-2) may be performed as the step (2a).

Step (2a): subjecting the support slurry to shaping, first drying and first calcining to obtain the catalyst support.

According to an aspect of the present application, in each of the preceding steps, the support slurry may be in the form of a paste, a slurry or the like, preferably a slurry. As the method for the shaping, it is preferable that the support slurry is formed into microspheres having a particle size of 20-200 μm by spray drying. To facilitate spray drying, the support slurry may generally have a solid content of 10-50% by weight, preferably 20-50% by weight, before drying. The solid content can be adjusted in a conventionally known manner, such as by thickening the support slurry or adding water to the support slurry, without particular limitation.

According to an aspect of the present application, in step (1-2) or step (2a), the drying or the first drying may be performed in a manner and method known to those skilled in the art, for example, the drying method may be airing, oven drying, or forced air drying. Conditions for the drying may include, for example, a drying temperature of generally 25-400° C., preferably 100-350° C., and a drying time of generally 0.5 hours or more, preferably 0.5-100 hours, more preferably 2-20 hours.

According to an aspect of the present application, in the step (1-2) or the step (2a), the calcining or the first calcining may be performed in a manner and method known to those skilled in the art. Conditions for the calcining may include, for example, a calcining temperature of generally 400-700° C., preferably 450-650° C., and a calcining time of generally 0.5 hours or more, preferably 0.5-100 hours, more preferably 0.5-10 hours, under an oxygen-containing atmosphere (such as an air atmosphere).

Step (1-3): contacting the component 4) with said catalyst support to obtain a catalyst precursor.

According to an aspect of the present application, in each of the aforementioned steps, as the manner of the contacting, for example, a method of mixing the respective components with each other in a predetermined relative charge ratio until a uniform system is obtained may be mentioned for convenience. The mixing may be performed under stirring, if necessary.

According to an aspect of the present application, the steps (1-3) may be performed as the step (3a).

Step (3a): incorporating the component 4) into the catalyst support, followed by a second drying, to obtain the catalyst precursor.

According to an aspect of the present application, in the step (1-3) or the step (3a), the contacting or the incorporating is preferably performed by an impregnation method or a precipitation method. By way of example, to carry out the impregnation method, the catalyst support may be impregnated with a solution or suspension of the component 4); or alternatively, to carry out the precipitation method, a solution or suspension of the component 4) may be mixed with the catalyst support first, and then precipitated by adding therein an aqueous ammonia. These methods are conventionally known in the art and will not be described in detail herein.

According to an aspect of the present application, in step (3a), the second drying may be performed in a manner and method known to those skilled in the art, for example, the drying method may be airing, drying, and forced air drying. Conditions for the drying may include, for example, a drying temperature of 50-300° C., preferably 100-250° C. and a drying time of 0.5-8 hours, preferably 1-5 hours.

According to an aspect of the present application, the component 1) is a sulfur-storing metal oxide and/or a precursor thereof. The sulfur-storing metal oxide is as described hereinbefore. The precursor of the sulfur-storing metal oxide may be any material that can be converted into the sulfur-storing metal oxide via the contact reaction in step (1) and/or under the calcination conditions in step (2), and particularly, a hydroxide (e.g., zinc hydroxide), a hydrate, and a water-soluble salt (e.g., zinc sulfate, zinc nitrate, zinc acetate), and the like of the sulfur-storing metal may be mentioned, and those skilled in the art may make a routine choice for this without any particular limitation. Further, the component 1) may be added to the contacting step as it is, or may be added to the contacting step after being mixed with water to form an aqueous solution or a slurry, without any particular limitation.

According to an aspect of the present application, the component 2) is an inorganic binder and/or a precursor thereof. Here, the inorganic binder is as described hereinbefore. The precursor of the inorganic binder may be any material that can be converted into the inorganic binder via the contact reaction in step (1) and/or under the calcining conditions in step (2), and those skilled in the art can make a routine choice for this without any particular limitation. The component 2) may be added to the contacting step as it is, or may be added to the contacting step after being mixed with water to form an aqueous solution or a slurry, without any particular limitation.

According to an aspect of the present application, as the component 2), particularly as the precursor of the aluminum oxide, for example, a material that can be converted into aluminum oxide under the calcination conditions in the step (2) may be mentioned, and particularly, for example, SB powder, hydrated alumina, alumina sol, boehmite monohydrate (boehmite), pseudo-boehmite monohydrate (pseudo-boehmite), alumina trihydrate and amorphous aluminum hydroxide may be mentioned, with SB powder, pseudo-boehmite and alumina sol being preferred. These precursors may be used singly or in a combination of two or more thereof at any ratio.

According to an aspect of the present application, as the component 2), particularly as the precursor of the titanium oxide, for example, a material that can be hydrolyzed via the contact reaction in the step (1) and then converted into anatase type titanium dioxide under the calcination conditions in the step (2) may be mentioned, and specific examples thereof include titanium tetrachloride, ethyl titanate, isopropyl titanate, titanium acetate and titania hydrate. These precursors may be used singly or in a combination of two or more thereof at any ratio.

According to an aspect of the present application, as the component 2), particularly as the precursor of the zirconium oxide, for example, a material that can be hydrolyzed via the contact reaction in the step (1) and then converted into zirconia under the calcination conditions in the step (2) may be mentioned, and particularly, for example, zirconium tetrachloride, zirconium oxychloride, zirconium acetate, hydrated zirconia and amorphous zirconia may be mentioned. These precursors may be used singly or in a combination of two or more thereof at any ratio.

According to an aspect of the present application, as the component 2), particularly as the precursor of the tin oxide, for example, a material that can be hydrolyzed via the contact reaction in the step (1) and then converted into tin dioxide under the calcination conditions in the step (2) may be mentioned, and specific examples thereof include tin tetrachloride, tin tetraisopropoxide, tin acetate and hydrated tin oxide. These precursors may be used singly or in a combination of two or more thereof at any ratio.

According to an aspect of the present application, the component 3) is a wear-resistant component and/or a precursor thereof. The wear-resistant component is as described hereinbefore. In addition, as the precursor of the wear-resistant component, for example, any material that can be converted into the wear-resistant component via the contact reaction in step (1) and/or under the calcining conditions in step (2) may be mentioned, and those skilled in the art can make a routine choice for this without any particular limitation. The component 3) may be added to the contacting step as it is, or may be added to the contacting step after being mixed with water to form an aqueous solution or a slurry, without any particular limitation.

According to an aspect of the present application, the component 4) is an active metal component and/or a precursor thereof. Here, the active metal component is as described hereinbefore. In addition, as the precursor of the active metal component, any material that can be converted into the active metal component via the contact reaction in the step (1) and/or under the calcination conditions in the step (2) may be mentioned, and particularly, hydroxides, hydrates, organic salts (such as acetates and oxalates, etc.) and inorganic salts (such as carbonates, nitrates, sulfates, thiocyanates, etc., particularly nitrates) of the corresponding metal element in the active metal component may be mentioned, and those skilled in the art may make a routine choice for this without any particular limitation. These precursors may be used singly or in a combination of two or more thereof at any ratio. The component 4) may be added to the contacting step as it is, or may be added to the contacting step after being mixed with water to form an aqueous solution or a slurry, without any particular limitation.

According to an aspect of the present application, the component 5) is an optional component, which is an acidic porous material and/or a precursor thereof. Here, the acidic porous material is as described hereinbefore. As the precursor of the acidic porous material, any material that can be converted into the acidic porous material via the contact reaction in step (1) and/or under the calcining conditions in step (2) may be mentioned, and those skilled in the art can make a routine choice for this without any particular limitation. The component 5) may be added to the contacting step as it is, or may be added to the contacting step after being mixed with water to form an aqueous solution or a slurry, without any particular limitation.

According to an aspect of the present application, in the production method, an additive and/or a precursor thereof may be further introduced as an additive component to the contacting step (including step (1), step (1-1), or step (1a) and/or step (1b)) as necessary. Here, the additive is as described hereinbefore. As the precursor of the additive, any material that can be converted into the additive via the contact reaction in step (1) and/or under the calcining conditions in step (2) may be mentioned, and those skilled in the art can make a routine choice for this without any particular limitation. The additive may be added to the contacting step as it is, or may be added to the contacting step after being mixed with water to form an aqueous solution or a slurry, without any particular limitation. Further, the amount of the additive component may be determined in accordance with the conventional knowledge in the art, without any particular limitation.

According to an aspect of the present application, as the precursor of the alkali metal oxide, for example, a material that can be converted into an alkali metal oxide under the calcination conditions in the step (2) may be mentioned, and particularly, for example, hydroxides, nitrates, sulfates and phosphates of alkali metals may be mentioned. These precursors may be used singly or in a combination of two or more thereof at any ratio.

According to an aspect of the present application, the component 6) is a contact medium. Here, as the contact medium, for example, any medium conventionally used in the art for the production of desulfurization catalysts may be mentioned, and particularly, water, alcohol and acidic liquid may be mentioned. These contact media may be used singly or in combination of two or more at an arbitrary ratio.

According to an aspect of the present application, the amount of water used is not particularly limited, as long as the contact reaction can be allowed to proceed, for example, in the form of a slurry. Here, when calculating the amount of the water to be used, it is necessary to consider the water consumed when forming the components (including the additive component) into an aqueous solution or a slurry as described above (if any).

According to an aspect of the present application, the acidic liquid may be an acid or an aqueous acid solution. In addition, as the acid, for example, water-soluble inorganic acids and water-soluble organic acids may be mentioned, and specific examples thereof include hydrochloric acid, nitric acid, phosphoric acid, and acetic acid. These acids may be used singly or in a combination of two or more thereof at any ratio. In addition, the acidic liquid is generally used in an amount such that the pH of the contact reaction is in the range of from 1 to 5, preferably from 1.5 to 4.

In the method according to an aspect of the present application, as the amounts of the respective components, the relative charge ratio by weight between the respective components is generally as follows:

the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water being (10-80):(3-35):(5-40):(5-30):(0-20):(50-500), and the acid: the component 2) (calculated on the basis of oxide) being (0.01-1.0):1.

In the method according to an aspect of the present application, as the amounts of the respective components, the relative charge ratio by weight between the respective components is preferably as follows:

the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water being (25-70):(6-25):(10-30):(8-25):(1-15):(100-400), and the acid: the component 2) (calculated on the basis of oxide) being (0.02-0.9):1.

In the method according to an aspect of the present application, as the amounts of the respective components, the relative charge ratio by weight between the respective components is preferably as follows:

the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water being (40-60):(8-15):(12-25):(12-20):(2-10):(150-300), and the acid: the component 2) (calculated on the basis of oxide) being (0.03-0.8):1.

Step (2): optionally, calcining the catalyst precursor (referred to as a second calcining) to obtain the desulfurization catalyst. Here, the desulfurization catalyst may be referred to as a calcined desulfurization catalyst, and is also within the scope of the present application.

According to an aspect of the present application, in the step (2), the second calcining may be performed in a manner and method known to those skilled in the art. By way of example, conditions for the calcining may include a calcining temperature of generally 300-800° C., preferably 450-

750° C., and a calcining time of generally 0.5 h or more, preferably 1-3 h. In addition, the second calcining may be performed in the presence of oxygen or an oxygen-containing gas.

Step (3): optionally, reducing the desulfurization catalyst.

According to an aspect of the present application, in step (3), only the active metal component in the desulfurization catalyst is at least partially (preferably completely) converted into the simple metal of the corresponding metal element by the reduction, so that the active metal component is substantially present in a reduced state, but the metal element possibly contained in other components in the desulfurization catalyst is substantially not converted into the simple metal. By way of example, conditions for the reduction may include a reduction temperature of generally 300-600° C., preferably 400-500° C., a reduction time of generally 0.5-6 hours, preferably 1-3 hours, and a hydrogen-containing atmosphere (preferably having a hydrogen content of 10-60 vol %).

According to an aspect of the present application, said step (3) may be carried out immediately after the end of step (2), or may be carried out before the use of the desulfurization catalyst (i.e. before the catalytic desulfurization is carried out). Since the active metal component is susceptible to oxidation, it is preferable to perform the step (3) before the use of the desulfurization catalyst for convenience of transportation.

According to an aspect of the present application, any of the foregoing desulfurization catalysts of the present application has the desulfurization activity for hydrocarbon oils. Here, the desulfurization catalyst includes both the desulfurization catalyst described hereinbefore and the desulfurization catalyst produced by the method described hereinbefore. To this end, the present application also relates to a desulfurization method.

According to an aspect of the present application, the desulfurization method comprises the step of contacting a sulfur-containing hydrocarbon oil with any of the desulfurization catalysts of the present application as described above under desulfurization conditions. Here, by the contacting, the sulfur content of the hydrocarbon oil can be reduced to 10 µg/g or less, or even lower.

According to an aspect of the present application, as the hydrocarbon oil, crude oil or petroleum fraction having a boiling range of no more than 450° C., particularly a petroleum fraction having a boiling range of from −42.1° C. to 350° C., may be mentioned, more preferably it may be selected from the group consisting of liquefied petroleum gas, cracked gasoline and diesel fuel. These hydrocarbon oils may be used singly or in a combination of two or more thereof at any ratio.

According to an aspect of the present application, the sulfur content in the hydrocarbon oil is typically 200-1000 µg/g.

According to an aspect of the present application, in the desulfurization method, the contacting may be carried out, for example, in a countercurrent or concurrent manner. In addition, the contacting can be carried out, for example, in any reactor conventionally known in the art for such an application. Specific examples of the reactor include a fixed bed reactor and a fluidized bed reactor.

According to an aspect of the present application, in the desulfurization method, specific examples of the desulfurization conditions may include: a hydrogen atmosphere, a reaction temperature of generally 350-500° C., preferably 400-450° C., a reaction pressure of generally 0.5-4 MPa (absolute pressure), preferably 1.0-2.0 MPa (absolute pressure), a hydrogen-to-oil ratio by volume of generally 0.1-0.5, preferably 0.15-0.4, and a mass space velocity of generally 2-6 h$^{-1}$, preferably 2.5-5 h$^{-1}$.

According to an aspect of the present application, the desulfurization catalyst may be regenerated after the catalytic desulfurization reaction and reused. For this purpose, the regeneration may be carried out under an oxygen atmosphere, and the conditions of the regeneration may include: a regeneration pressure of normal pressure (101325 Pa), and a regeneration temperature of 400-700° C., preferably 500-600° C.

According to an aspect of the present application, the regenerated desulfurization catalyst needs to be further reduced under a hydrogen-containing atmosphere before reused in the desulfurization of the hydrocarbon oil. To this end, conditions for the reduction of the regenerated desulfurization catalyst may include: a temperature of 350-500° C., preferably 400-450° C., and a pressure of 0.2-2 MPa (absolute pressure), preferably 0.2-1.5 MPa (absolute pressure).

EXAMPLES

The present application is further illustrated and described below with reference to examples, but the present application is not limited to these examples.

Example 1

2.38 kg of titanium tetrachloride (Beijing Chemical Works, analytical purity, 99 wt %) was slowly added to 4.6 kg of 5 wt % diluted hydrochloric acid, and slowly stirred to avoid crystallization of titanium oxide, to obtain a pale yellow transparent titanium sol with a pH of 2.0.

4.43 kg of zinc oxide powder (Headhorse Company, purity 99.7 wt %), 0.75 kg of HIM-5 molecular sieve (Changling Branch of Sinopec Catalyst Co., Ltd., 0.70 kg on a dry basis, $SiO_2:Al_2O_3$ molar ratio of 25), 2.06 kg of hexagonal boron nitride (purity >99.0%, Qinhuangtao ENO High-Tech Material Development Co., Ltd.) and 6.57 kg of deionized water were mixed, and stirred for 30 minutes to obtain a mixed slurry of zinc oxide, HIM-5 molecular sieve and hexagonal boron nitride; then the titanium sol was added, mixed and stirred for 1 h to obtain a support slurry with a pH of 3.5.

The resulted support slurry was spray dried using a Niro Bowen Nozzle Tower™ spray dryer at 8.5 MPa with an inlet temperature of the spray drying gas of 480° C. and an outlet temperature of 150° C. The microspheres obtained by spray drying were firstly dried for 1 h at 180° C., and then calcined for 1 h at 635° C. to obtain a catalyst support.

3.2 kg of the catalyst support was impregnated with a solution containing 3.51 kg of nickel nitrate hexahydrate (Beijing Chemical Reagents, purity >98.5 wt %) and 0.6 kg of deionized water, the impregnated material was dried at 180° C. for 4 h, and calcined at 635° C. in air atmosphere for 1 h to obtain a calcined product.

The calcined product was reduced in a hydrogen atmosphere (hydrogen content 70 vol %, and the remainder being nitrogen) at 425° C. for 2 hours to obtain a desulfurization catalyst A1. The composition, on a dry basis, of the desulfurization catalyst A1 is: 44.3 wt % of zinc oxide, 20.6 wt % of hexagonal boron nitride, 7.0 wt % of HIM-5 molecular sieve, 10.0 wt % of titanium dioxide, and 18.1 wt % of nickel.

Example 2

1.56 kg of pseudo-boehmite (Nanjing Branch of Sinopec Catalyst Co., Ltd., 1.17 kg on a dry basis) and 1.50 kg of hexagonal boron nitride (purity >99.0%, Qinhuangtao ENO High-Tech Material Development Co., Ltd.) were mixed under stirring, then 8.2 kg of deionized water was added and mixed uniformly to form a slurry, 260 ml of 30 wt % hydrochloric acid was added to obtain a pH of the slurry of 1.9, and the slurry was acidified under stirring for 1 h and then heated to 80° C. for aging for 2 h. After the temperature was lowered, 5.52 kg of zinc oxide powder and 0.38 kg of REY molecular sieve (Qilu Branch of Sinopec Catalyst Co., Ltd., 0.3 kg on a dry basis, $SiO_2:Al_2O_3$ molar ratio of 2, rare earth content of 16 wt %) were added and stirred for 1 hour to obtain a support slurry with pH of 3.5.

The catalyst support slurry was spray dried, nickel was incorporated as an active component, and the resultant was reduced to obtain a desulfurization catalyst A2, in a similar manner as described in Example 1.

The composition, on a dry basis, of the desulfurization catalyst A2 is: 55.2 wt % of zinc oxide, 15.0 wt % of hexagonal boron nitride, 3.0 wt % of REY molecular sieve, 11.7 wt % of alumininum oxide, and 15.1 wt % of nickel.

Example 3

4.83 kg of zinc oxide powder, 1.26 kg of SAPO-34 molecular sieve (1.0 kg on a dry basis, Qilu Branch of Sinopec Catalyst Co., Ltd.) and 1.2 kg of hexagonal boron nitride and 8.8 kg of deionized water were mixed, and stirred for 30 minutes to obtain a mixed slurry of zinc oxide, SAPO-34 molecular sieve and hexagonal boron nitride.

3.90 kg of ethyl titanate (Aldrich, analytical purity, 99 wt %) and 1.6 kg of deionized water were slowly added to 3.8 kg of 10 wt % nitric acid (analytical purity, Beijing Chemical Works) under stirring, at a pH=2.3, and stirred for 1 h to obtain a pale yellow transparent titanium sol; then the mixed slurry of zinc oxide, SAPO-34 molecular sieve and hexagonal boron nitride was added, and stirred for 1 h to obtain a catalyst support slurry with a pH of 3.5.

The spray drying of the catalyst support slurry was carried out in a similar manner as described in Example 1.

A calcined product and a catalyst were prepared in a similar manner as described in Example 1, except that the catalyst support was impregnated with a solution of nickel nitrate and cobalt nitrate instead of nickel nitrate hexahydrate, nickel and cobalt were incorporated as an active component, and the resultant was reduced to obtain a desulfurization catalyst A3.

The composition, on a dry basis, of the desulfurization catalyst A3 is: 48.3 wt % of zinc oxide, 12.0 wt % of hexagonal boron nitride, 10.0 wt % of SAPO-34 molecular sieve, 13.5 wt % of titanium dioxide, 8.1 wt % of nickel, and 8.1 wt % of cobalt.

Example 4

4.83 kg of zinc oxide powder, 1.04 kg of ZSP-3 molecular sieve (1.0 kg on a dry basis, Qilu Branch of Sinopec Catalyst Co., Ltd.) and 1.2 kg of hexagonal boron nitride and 8.8 kg of deionized water were mixed, and stirred for 30 minutes to obtain a mixed slurry of zinc oxide, ZSP-3 molecular sieve and hexagonal boron nitride.

3.90 kg of ethyl titanate (Aldrich, analytical purity, 99 wt %) and 1.6 kg of deionized water were slowly added to 3.8 kg of 10 wt % nitric acid (analytical purity, Beijing Chemical Works) under stirring, at a pH=2.3, and stirred for 1 h to obtain a pale yellow transparent titanium sol; then the mixed slurry of zinc oxide, ZSP-3 molecular sieve and hexagonal boron nitride was added, and stirred for 1 h to obtain a support slurry with a pH of 3.5.

The catalyst support slurry was spray dried, nickel was incorporated as an active component, and the resultant was reduced to obtain a desulfurization catalyst A4, in a similar manner as described in Example 1.

The composition, on a dry basis, of the desulfurization catalyst A4 is: 48.3 wt % of zinc oxide, 12.0 wt % of hexagonal boron nitride, 10.0 wt % of ZSP-3 molecular sieve, 13.5 wt % of titanium dioxide, and 16.2 wt % of nickel.

Example 5

4.43 kg of zinc oxide powder, 0.88 kg of HP molecular sieve (Qilu Branch of Sinopec Catalyst Co., Ltd., 0.70 kg on a dry basis, $SiO_2:Al_2O_3$ molar ratio of 8), 2.06 kg of hexagonal boron nitride and 6.57 kg of deionized water were mixed, and stirred for 30 minutes to obtain a mixed slurry of zinc oxide, HP molecular sieve and hexagonal boron nitride;

1.33 kg of pseudo-boehmite (Shandong Aluminum Plant, 1.0 kg on a dry basis) and 4.6 kg of deionized water were mixed uniformly to obtain a slurry, 300 ml of 30 wt % hydrochloric acid (chemical purity, Beijing Chemical Works) was added to obtain a pH of the slurry of 2.5, the mixture was acidified under stirring for 1 hour, and then heated to 80° C. for aging for 2 hours. The mixed slurry of zinc oxide, molecular sieve and hexagonal boron nitride was added, and stirred for 1 h to obtain a support slurry.

The catalyst support slurry was spray dried, nickel was incorporated as an active component, and the resultant was reduced to obtain a desulfurization catalyst A5, in a similar manner as described in Example 1.

The composition, on a dry basis, of the desulfurization catalyst A5 is: 44.3 wt % of zinc oxide, 20.6 wt % of hexagonal boron nitride, 7.0 wt % of HP molecular sieve, 10.0 wt % of aluminum oxide and 18.1 wt % of nickel.

Example 6

4.43 kg of zinc oxide powder, 0.88 kg of ZRP-1 molecular sieve (Qilu Branch of Sinopec Catalyst Co., Ltd., 0.7 kg on a dry basis), 2.06 kg of hexagonal boron nitride and 6.57 kg of deionized water were mixed, and stirred for 30 minutes to obtain a mixed slurry of zinc oxide, ZRP-1 molecular sieve and hexagonal boron nitride.

1.91 kg of zirconium tetrachloride (Beijing Chemical Works, analytical purity, 99 wt %) was slowly added into 3.0 kg of deionized water, 4.6 kg of 5 wt % nitric acid solution was added, and slowly stirred to avoid crystallization of zirconium oxide, to obtain a light yellow transparent zirconium sol with a pH of 2.1; then the mixed slurry of zinc oxide, ZRP-1 molecular sieve and hexagonal boron nitride was added, and stirred for 1 h to obtain a support slurry with a pH of 3.5.

The support slurry was spray dried, nickel was incorporated as an active component, and the resultant was reduced to obtain a desulfurization catalyst A6, in a similar manner as described in Example 1.

The composition, on a dry basis, of the desulfurization catalyst A6 is: 44.3 wt. % of zinc oxide, 20.6 wt. % of hexagonal boron nitride, 7.0 wt. % of ZRP-1 molecular sieve, 10.0 wt. % of zirconium dioxide, and 18.1 wt. % of nickel.

Example 7

4.43 kg of zinc oxide powder, 0.88 kg of REUSY molecular sieve (Qilu Branch of Sinopec Catalyst Co., Ltd., 0.7 kg on a dry basis), 2.06 kg of hexagonal boron nitride and 6.57 kg of deionized water were mixed, and stirred for 30 minutes to obtain a mixed slurry of zinc oxide, REUSY molecular sieve and hexagonal boron nitride;

1.91 kg of zirconium tetrachloride (Beijing Chemical Works, analytical purity, 99 wt %) was slowly added into 3.0 kg of deionized water, 4.6 kg of 5 wt % nitric acid solution was added, and slowly stirred to avoid crystallization of zirconium oxide, to obtain a light yellow transparent zirconium sol with a pH of 2.1; and the mixed slurry of zinc oxide, REUSY molecular sieve and hexagonal boron nitride was added, and stirred for 1 h to obtain a support slurry with a pH of 3.5.

The support slurry was spray dried, nickel was incorporated as an active component, and the resultant was reduced to obtain a desulfurization catalyst A7, in a similar manner as described in Example 1.

The composition, on a dry basis, of the desulfurization catalyst A7 is: 44.3 wt. % of zinc oxide, 20.6 wt. % of hexagonal boron nitride, 7.0 wt. % of REUSY molecular sieve, 10.0 wt. % of zirconium dioxide, and 18.1 wt. % of nickel.

Example 8

4.43 kg of zinc oxide powder, 0.92 kg of P—IM-5 molecular sieve (Changling Branch of Sinopec Catalyst Co., Ltd., 0.7 kg on a dry basis, $SiO_2:Al_2O_3$ molar ratio of 25, P content of 3 wt %), 2.06 kg of hexagonal boron nitride and 6.57 kg of deionized water were mixed, and stirred for 30 minutes to obtain a mixed slurry of zinc oxide, P—IM-5 molecular sieve and hexagonal boron nitride.

1.91 kg of zirconium tetrachloride (Beijing Chemical Works, analytical purity, 99 wt %) was slowly added into 3.0 kg of deionized water, 4.6 kg of 5 wt % nitric acid solution was added, and slowly stirred to avoid crystallization of zirconium oxide, to obtain a light yellow transparent zirconium sol with a pH of 2.1; then the mixed slurry of zinc oxide, P—IM-5 molecular sieve and hexagonal boron nitride was added, and stirred for 1 h to obtain a support slurry with a pH of 3.5.

The support slurry was spray dried, nickel was incorporated as an active component, and the resultant was reduced to obtain a desulfurization catalyst A8, in a similar manner as described in Example 1.

The composition, on a dry basis, of the desulfurization catalyst A8 is: 44.3 wt % of zinc oxide, 20.6 wt % of hexagonal boron nitride, 7.0 wt % of P—IM-5 molecular sieve, 10.0 wt % of zirconium dioxide and 18.1 wt % of nickel.

Example 9

1.91 kg of zirconium tetrachloride (Beijing Chemical Works, analytical purity, 99 wt %) was slowly added into 3.0 kg of deionized water, 4.6 kg of 5 wt % nitric acid solution was added, and slowly stirred to avoid crystallization of zirconium oxide, to obtain a light yellow transparent zirconium sol with a pH of 2.1;

4.43 kg of zinc oxide powder (Headhorse Company, purity 99.7 wt %), 0.88 kg of HP molecular sieve (Qilu Branch of Sinopec Catalyst Co., Ltd., 0.70 kg on a dry basis, and $SiO_2:Al_2O_3$ molar ratio of 8), 2.06 kg of cubic boron nitride (purity >99.0%, Qinhuangtao ENO High-Tech Material Development Co., Ltd.) and 6.57 kg of deionized water were mixed, and stirred for 30 minutes to obtain a mixed slurry of zinc oxide, HP molecular sieve and cubic boron nitride; then the zirconium sol was added, mixed and stirred for 1 h to obtain a support slurry.

The catalyst support slurry was spray dried, nickel was incorporated as an active component, and the resultant was reduced to obtain a desulfurization catalyst A9, in a similar manner as described in Example 1.

The composition, on a dry basis, of the desulfurization catalyst A9 is: 44.3 wt % of zinc oxide, 20.6 wt % of cubic boron nitride, 7.0 wt % of HP molecular sieve, 10.0 wt % of zirconium oxide and 18.1 wt % of nickel.

Comparative Example 1

4.43 kg of zinc oxide powder and 6.57 kg of deionized water were mixed, and stirred for 30 minutes to obtain a zinc oxide slurry.

1.81 kg of pseudo-boehmite (Nanjing Branch of Sinopec Catalyst Co., Ltd., 1.36 kg on a dry basis) and 2.46 kg of expanded perlite (Nanjing Branch of Sinopec Catalyst Co., Ltd., 2.40 kg on a dry basis) were mixed under stirring, then 4.6 kg of deionized water was added and mixed uniformly, then 360 ml of 30 wt % hydrochloric acid was added to obtain a pH of the slurry of 2.1, the mixture was acidified under stirring for 1 h, then heated to 80° C. for aging for 2 h, then the zinc oxide slurry was added, mixed, and stirred for 1 h to obtain a support slurry.

The catalyst support slurry was spray dried, nickel was incorporated as an active component, and the resultant was reduced to obtain a desulfurization catalyst B1, in a similar manner as described in Example 1.

The composition, on a dry basis, of the desulfurization catalyst B1 is: 44.3 wt. % of zinc oxide, 24.0 wt. % of expanded perlite, 13.6 wt. % of aluminum oxide, and 18.1 wt. % of nickel.

Comparative Example 2

1.56 kg of pseudo-boehmite (Shandong Aluminum Plant, 1.17 kg on a dry basis) and 1.85 kg of diatomite (1.80 kg on a dry basis) were mixed under stirring, then 8.2 kg of deionized water was added and mixed uniformly, 260 ml of 30 wt % hydrochloric acid was added to obtain a pH of the slurry of 1.9, the mixture was acidified under stirring for 1 h, and then heated to 80° C. for aging for 2 h. After the temperature was lowered, 5.52 kg of zinc oxide powder was added and stirred for 1 hour to obtain a support slurry.

The support slurry was spray dried, nickel was incorporated as an active component, and the mixture was reduced to obtain a desulfurization catalyst B2, in a similar manner as described in Example 1.

The composition, on a dry basis, of the desulfurization catalyst B2 is: 55.2 wt. % of zinc oxide, 18.0 wt. % of diatomite, 11.7 wt. % of aluminum oxide, and 15.1 wt. % of nickel.

Comparative Example 3

4.93 kg of zinc oxide powder and 5.57 kg of deionized water were mixed, and stirred for 30 minutes to obtain a zinc oxide slurry.

1.80 kg of pseudo-boehmite (Shandong Aluminum Plant, 1.35 kg on a dry basis) and 2.16 kg of diatomite (World Mining Company, 2.10 kg on a dry basis) were mixed under stirring, then 4.6 kg of deionized water was added and mixed uniformly, 300 ml of 30 wt % hydrochloric acid was added to obtain a pH of the slurry of 2.5, the mixture was acidified under stirring for 1 hour, and then heated to 80° C. for aging for 2 hours. The zinc oxide slurry was added, mixed and stirred for 1 h to obtain a support slurry.

The support slurry was spray dried, nickel and cobalt were incorporated as an active component, and the resultant was reduced to obtain a desulfurization catalyst B3, in a similar manner as described in Example 3.

The composition, on a dry basis, of the desulfurization catalyst B3 is: 49.3 wt % of zinc oxide, 21.0 wt % of diatomite, 13.5 wt % of aluminum oxide, 8.1 wt % of nickel, and 8.1 wt % of cobalt.

Comparative Example 4

1.56 kg of pseudo-boehmite (1.17 kg on a dry basis, Nanjing Branch of Sinopec Catalyst Co., Ltd.) and 1.54 kg of expanded perlite (1.50 kg on a dry basis, Nanjing Branch of Sinopec Catalyst Co., Ltd.) were mixed under stirring, then 8.2 kg of deionized water was added and mixed uniformly to form a slurry, 260 ml of 30 wt % hydrochloric acid was added to obtain a pH of the slurry of 1.9, and the mixture was acidified under stirring for 1 hour and then heated to 80° C. for aging for 2 hours. After the temperature was lowered, 5.52 kg of zinc oxide powder and 0.37 kg of P—IM-5 molecular sieve (Changling Branch of Sinopec Catalyst Co., Ltd., 0.3 kg on a dry basis, $SiO_2:Al_2O_3$ molar ratio of 25, and P content of 3 wt %) were added and stirred for 1 hour to obtain a support slurry.

The support slurry was spray dried, nickel was incorporated as an active component, and the mixture was reduced to obtain a desulfurization catalyst B4, in a similar manner as described in Example 1.

The composition, on a dry basis, of the desulfurization catalyst B4 is: 55.2 wt % of zinc oxide, 15.0 wt % of expanded perlite, 3.0 wt % of P—IM-5 molecular sieve, 11.7 wt % of aluminum oxide and 15.1 wt % of nickel.

Comparative Example 5

2.38 kg of titanium tetrachloride (Beijing Chemical Works, analytical purity, 99 wt %) was slowly added to 4.6 kg of 5 wt % diluted hydrochloric acid, and slowly stirred to avoid crystallization of titanium oxide, to obtain a pale yellow transparent titanium sol with a pH of 2.0;

4.43 kg of zinc oxide powder (Headhorse Company, purity 99.7 wt %), 0.75 kg of HIM-5 molecular sieve (Changling Branch of Sinopec Catalyst Co., Ltd., 0.70 kg on a dry basis, $SiO_2:Al_2O_3$ molar ratio of 25), 2.06 kg of silicon nitride (purity >99.0%, Qinhuangtao ENO High-Tech Material Development Co., Ltd.) and 6.57 kg of deionized water were mixed, and stirred for 30 minutes to obtain a mixed slurry of zinc oxide, HIM-5 molecular sieve and silicon nitride; then the titanium sol was added, mixed and stirred for 1 h to obtain a support slurry with a pH of 3.5.

The catalyst support slurry was spray dried, nickel was incorporated as an active component, and the resultant was reduced to obtain a desulfurization catalyst B5, in a similar manner as described in Example 1.

The composition, on a dry basis, of the desulfurization catalyst B5 is: 44.3 wt % of zinc oxide, 20.6 wt % of silicon nitride, 7.0 wt % of HIM-5 molecular sieve, 10.0 wt % of titanium dioxide and 18.1 wt % of nickel.

Example 10

(1) Evaluation of the abrasion strength of the adsorbent for desulfurization of hydrocarbon oils. The desulfurization catalysts A1-A9 and B1-B5 were subjected to a test for abrasion strength. The abrasion index of the catalyst was measured using the straight-tube method for abrasion strength evaluation in accordance with the RIPP 29-90 test method described in "Petrochemical Analysis Methods (RIPP Test Methods)", and the results are shown in Table 1, in which a lower value indicates a higher abrasion strength. The abrasion indexes shown in Table 1 correspond to the percentage of the fine powders generated when being abraded under certain conditions.

(3) Evaluation of the desulfurization performance of the adsorbent for the desulfurization of hydrocarbon oils. Experiments for evaluating the desulfurization performance of the desulfurization catalysts A1-A9 and B1-B5 were carried out using a fixed-bed micro-activity test unit, in which 16 g of the desulfurization catalyst was loaded into a fixed-bed reactor having an inner diameter of 30 mm and a length of 1 m.

The hydrocarbon oil feed was catalytic cracked gasoline having a sulfur content of 1000 ppm. The desulfurization reaction of the sulfur-containing hydrocarbon oil was carried out under the following conditions: a reaction pressure of 2.1 MPa, a hydrogen flow rate of 6.3 L/h, a gasoline flow rate of 80 mL/h, a reaction temperature of 410° C., and a weight space velocity of the hydrocarbon oil feed of 4 to obtain a product gasoline.

The desulfurization activity of the desulfurization catalyst was evaluated in accordance with the sulfur content in the gasoline product. The sulfur content in the gasoline product was measured by the off-line chromatographic analysis method, using an instrument of model GC6890-SCD from Agilent company.

To provide an accurate characterization of the activity of the desulfurization catalyst in practical industrial operations, the spent catalyst obtained after the desulfurization evaluation experiment was regenerated at 550° C. in air atmosphere. The desulfurization catalyst was subjected to a desulfurization evaluation experiment, in which the activity of the catalyst was substantially stabilized after 6 cycles of regeneration, the sulfur content of the stabilized product gasoline obtained after the sixth cycle was used to represent the activity of the catalyst. The sulfur content of the stabilized product gasoline and the liquid yield are shown in Table 1.

The breakthrough sulfur capacities of the desulfurization catalysts A1-A9 and B1-B5 for gasoline desulfurization were calculated and the results are shown in Table 3. The breakthrough in the "breakthrough sulfur capacity" means from the beginning of the gasoline desulfurization test to the time when the sulfur content of the gasoline obtained goes beyond 10 μg/g. Breakthrough sulfur capacity refers to the total amount of sulfur adsorbed on the desulfurization catalyst (based on the total weight of the desulfurization catalyst) prior to the breakthrough.

The Motor Octane Number (MON) and Research Octane Number (RON) of the gasoline before the reaction and after the sixth cycle were determined, respectively, in accordance with GB/T 503-1995 and GB/T 5487-1995. The results are shown in Table 1.

The flow rates of the feed/exhaust gases in the reaction of the catalysts A1-A9 and B1-B5 in the presence of hydrogen were measured, and the concentrations of hydrogen in the gases were analyzed using QRD-1102A Thermal Conductivity Hydrogen Analyzer, and the amount of hydrogen added (Q1) and the amount of hydrogen discharged (Q2) were calculated, the difference in the amounts of hydrogen was determined, and the results are shown in Table 1.

As can be seen from the results shown in Table 1, the desulfurization catalysts according to the present application comprise the boron nitride component, and can still be used to effectively reduce the sulfur content of gasoline after several cycles of desulfurization, which indicates that the catalysts have better desulfurization activity and stability of activity. And the desulfurization catalysts have lower abrasion indexes, indicating a better abrasion strength, so that the desulfurization catalysts may have longer service life. The desulfurization catalyst of Comparative Example 4 comprises the HIM-5 molecular sieve but does not comprises boron nitride, and thus shows a much higher abrasion index than the catalysts obtained in the inventive examples, indicating that the desulfurization catalyst according to the present application may have better abrasion resistance. It can be seen from the comparison of the desulfurization catalyst A1, the desulfurization catalyst A7, and the desulfurization catalyst B5 that the adsorbent comprising hexagonal boron nitride having a layered structure shows better abrasion resistance and octane number improvement performance. Though zinc silicate may not be generated from silicon nitride, the layered structure of hexagonal boron nitride shows a better interaction with the binder, so that the adsorbent comprising it may have higher abrasion strength. In addition, silicon nitride does not have the effect of improving octane number and generating hydrogen gas.

Example 11

The desulfurization catalysts A1-A9 and B1-B5 were aged according to the following procedure: the catalyst was treated at 600° C. under an atmosphere with a steam partial pressure of 20 kPa for 16 hours.

Figure 2:
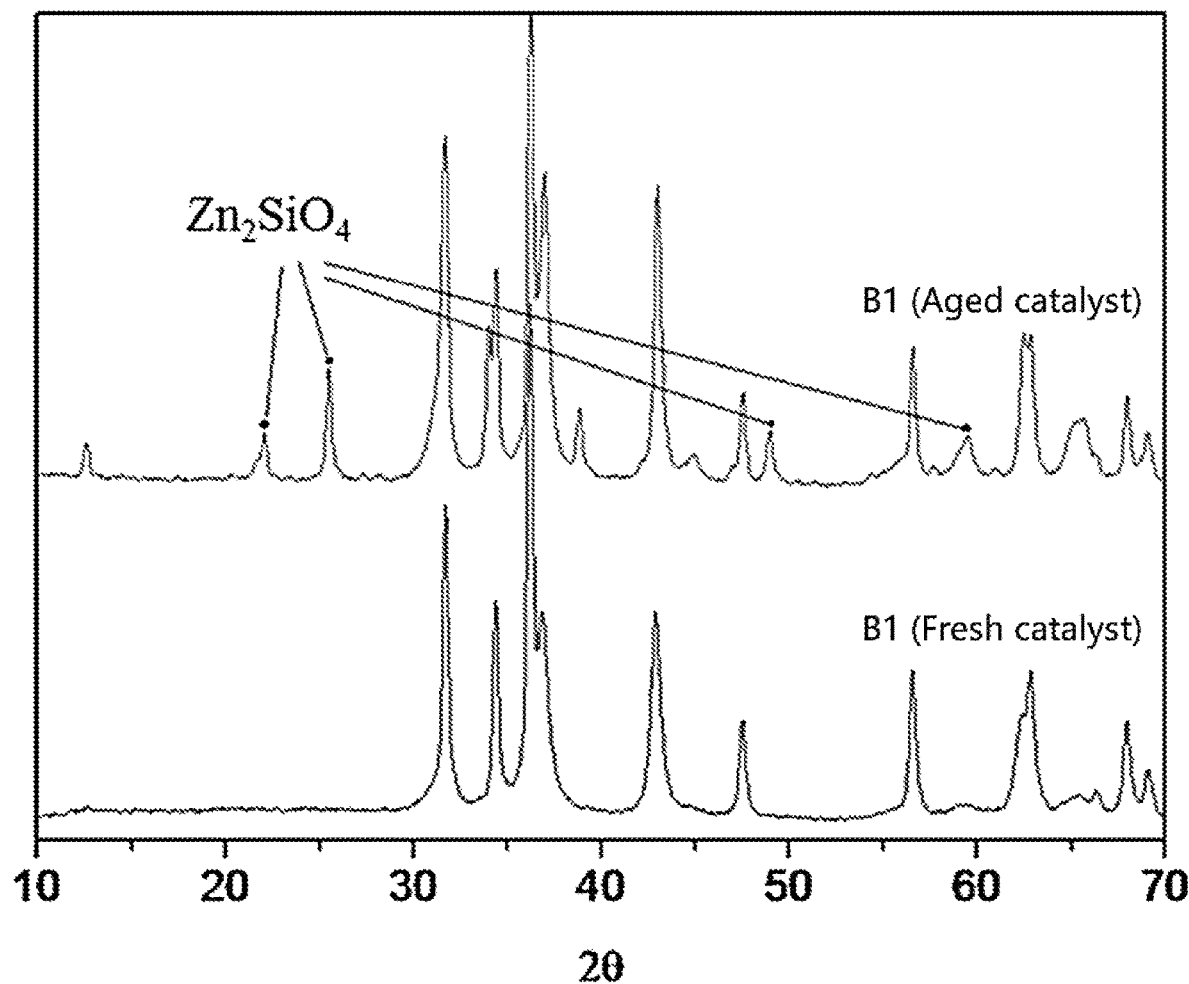
FIG. 2 is an XRD pattern of the desulfurization catalyst B1 obtained in Comparative Example 1 before and after hydrothermal aging.

XRD patterns of the desulfurization catalysts A1 and B1 before and after being aged are analyzed, wherein XRD patterns of the desulfurization catalyst A1 before and after hydrothermal aging are shown in FIG. 1, and both the fresh catalyst and the aged catalyst have characteristic peaks of boron nitride at the diffraction angles 2θ of 27.2°±0.5°, 41.5°±0.5° and 50.3°±0.5°. XRD patterns of the desulfurization catalyst B1 before and after hydrothermal aging are shown in FIG. 2.

In FIG. 1, the XRD pattern of the desulfurization catalyst A1 after hydrothermal aging does not show characteristic peaks of zinc silicate at 2θ=22.0, 25.54, 48.9 and 59.4. In FIG. 2, the XRD pattern of the desulfurization catalyst B1 after hydrothermal aging shows the above characteristic peaks of zinc silicate. Based on these XRD patterns, the zinc silicate content in these desulfurization catalysts was quantitatively analyzed by XRD measurement methods described hereinbefore, and the results are shown in Table 2.

The desulfurization performance of the aged desulfurization catalysts A1-A9 and B1-B5 was evaluated in the same manner as described in Example 10, and the results are shown in Table 2.

The breakthrough sulfur capacities of the aged desulfurization catalysts A1-A9 and B1-B5 for gasoline desulfurization were calculated, and the results are shown in Table 3.

The flow rates of the feed/exhaust gases for the reaction of the aged catalysts A1-A9 and B1-B5 in the presence of hydrogen were measured in the same manner as described in Example 10, and the hydrogen concentrations in the gases were analyzed using QRD-1102A Thermal Conductivity Hydrogen Analyzer, and the amount of hydrogen added (Q1) and the amount of hydrogen exhausted (Q2) were calculated, the difference in the amounts of hydrogen was determined, and the results are shown in Table 2.

As can be seen from the results of Table 2, no zinc silicate was generated in the desulfurization catalysts obtained in the inventive examples after the aging process, whereas, in the catalysts of Comparative Examples 1 to 4, zinc silicate was generated by the reaction between zinc oxide and silicon oxide-containing material, thereby reducing the desulfurization activity of the catalysts.

As can be seen from the data of the product gasoline shown in the Tables 1-2, the method according to the present application can provide high product gasoline yield, and has the advantage of substantially retaining the octane number of the gasoline.

As can be seen from Table 3, before aging, the breakthrough sulfur capacities of the desulfurization catalysts according to the present application for gasoline desulfurization were similar to those of the desulfurization catalysts of the Comparative Examples, and after aging, since no zinc silicate was generated in the desulfurization catalysts obtained in the inventive examples, while zinc silicate was generated in the catalysts of Comparative Examples 1 to 4 due to the reaction between zinc oxide and silica-containing material, the breakthrough sulfur capacities of the catalysts of Comparative Examples 1 to 4 were significantly decreased, and thus the desulfurization activity was also significantly decreased.

In addition, as can be seen from a comparison between the desulfurization catalyst A1 and the desulfurization catalyst B5, the desulfurization catalyst A1 comprising boron nitride shows better abrasion resistance, desulfurization performance, and octane number improvement performance than the desulfurization catalyst B5 comprising silicon nitride.

TABLE 1

| | Abrasion | | Product gasoline | | | | |
|---|---|---|---|---|---|---|---|
| No. | index of the catalyst | Sulfur content/ppm | Difference of hydrogen amount | Yield, wt. % | ΔMON | ΔRON | Δ(RON + MON)/2 |
| A1 | 1.7 | 4 | 4.0 | 99.8 | −0.20 | −0.30 | −0.25 |
| A2 | 2.1 | 4 | 3.5 | 99.8 | −0.40 | −0.30 | −0.35 |
| A3 | 2.4 | 5 | 3 | 99.7 | −0.20 | −0.25 | −0.23 |
| A4 | 2.6 | 7 | 2.6 | 99.7 | −0.30 | −0.35 | −0.33 |
| A5 | 1.7 | 5 | 4.1 | 99.8 | −0.32 | −0.38 | −0.35 |
| A6 | 1.5 | 4 | 4.1 | 99.8 | −0.36 | −0.30 | −0.33 |
| A7 | 1.6 | 4 | 3.9 | 99.8 | −0.36 | −0.30 | −0.33 |
| A8 | 1.6 | 4 | 4.0 | 99.8 | −0.34 | −0.30 | −0.32 |
| A9 | 2.7 | 6 | 3.0 | 99.7 | −0.45 | −0.45 | −0.45 |
| B1 | 7.0 | 10 | −2.6 | 99.7 | −0.50 | −0.50 | −0.50 |
| B2 | 7.8 | 8 | −2.6 | 99.8 | −0.58 | −0.50 | −0.54 |
| B3 | 7.4 | 8 | −2.1 | 99.8 | −0.45 | −0.45 | −0.45 |

TABLE 1-continued

| No. | Abrasion index of the catalyst | Sulfur content/ppm | Difference of hydrogen amount | Yield, wt. % | ΔMON | ΔRON | Δ(RON + MON)/2 |
|---|---|---|---|---|---|---|---|
| B4 | 7.4 | 9 | −1.8 | 99.8 | −0.35 | −0.30 | −0.33 |
| B5 | 4.5 | 8 | −2.3 | 99.7 | −0.50 | −0.50 | −0.50 |

Note:
the data of octane number shown in the table denote the change of octane number as compared to the feed gasoline, where "−" indicates a reduction in octane number as compared to the feed gasoline.

1. The feed gasoline had a sulfur content of 1000 ppm, a RON of 93.8 and a MON of 83.1.
2. ΔMON denotes the increase in product MON;
3. ΔRON denotes the increase in product RON;
4. Δ(RON+MON)/2 denotes the difference between the antiknock index of the product and that of the feed.
5. The difference of hydrogen amount denotes the difference between the amount of the hydrogen discharged (Q2) and the amount of the hydrogen added (Q1) per 1 kg of hydrocarbon oil, with a positive value indicating a generation of hydrogen and a negative value indicating a consumption of hydrogen.

TABLE 2

| No. | Zinc silicate content of the catalyst, wt % | Sulfur content/ppm | Difference of hydrogen amount | Yield, wt. % | ΔMON | ΔRON | Δ(RON + MON)/2 |
|---|---|---|---|---|---|---|---|
| A1 | 0 | 6 | 4.0 | 99.8 | −0.30 | −0.26 | −0.28 |
| A2 | 0 | 7 | 3.9 | 99.8 | −0.40 | −0.35 | −0.38 |
| A3 | 0 | 8 | 2.9 | 99.9 | −0.30 | −0.25 | −0.27 |
| A4 | 0 | 7 | 2.2 | 99.8 | −0.38 | −0.30 | −0.34 |
| A5 | 0 | 6 | 3.5 | 99.8 | −0.32 | −0.30 | −0.31 |
| A6 | 0 | 7 | 3.7 | 99.8 | −0.36 | −0.34 | −0.35 |
| A7 | 0 | 7 | 3.8 | 99.8 | −0.32 | −0.30 | −0.31 |
| A8 | 0 | 8 | 3.4 | 99.8 | −0.36 | −0.32 | −0.34 |
| A9 | 0 | 7 | 2.8 | 99.8 | −0.36 | −0.30 | −0.33 |
| B1 | 23.4 | 50 | −2.5 | 99.7 | −0.50 | −0.45 | −0.48 |
| B2 | 18.6 | 36 | −2.6 | 99.8 | −0.58 | −0.50 | −0.54 |
| B3 | 19.2 | 44 | −2.2 | 99.7 | −0.45 | −0.45 | −0.45 |
| B4 | 20.1 | 44 | −1.9 | 99.7 | −0.35 | −0.30 | −0.33 |
| B5 | 0 | 42 | −2.4 | 99.7 | −0.60 | −0.50 | −0.55 |

Note:
the data of octane number shown in the table denote the change of octane number as compared to the feed gasoline, where "−" indicates a reduction in octane number as compared to the feed gasoline.

1. The feed gasoline had a sulfur content of 1000 ppm, a RON of 93.8 and a MON of 83.1.
2. ΔMON denotes the increase in product MON;
3. ΔRON denotes the increase in product RON;
4. Δ(RON+MON)/2 denotes the difference between the antiknock index of the product and that of the feed.
5. The difference of hydrogen amount denotes the difference between the amount of the hydrogen discharged (Q2) and the amount of the hydrogen added (Q1) per 1 kg of hydrocarbon oil, with a positive value indicating a generation of hydrogen and a negative value indicating a consumption of hydrogen.

TABLE 3

| No. | Before aging Breakthrough sulfur capacity, wt % | After aging Breakthrough sulfur capacity, wt % |
|---|---|---|
| A1 | 9.4 | 9.3 |
| A2 | 9.5 | 9.3 |
| A3 | 8.9 | 8.8 |
| A4 | 9.1 | 8.6 |
| A5 | 9.3 | 9.1 |
| A6 | 9.3 | 9.1 |
| A7 | 9.3 | 9.0 |
| A8 | 9.4 | 9.1 |
| A9 | 9.2 | 7.8 |
| B1 | 8.9 | 3.1 |
| B2 | 8.7 | 3.1 |
| B3 | 8.6 | 3.0 |
| B4 | 8.8 | 3.3 |
| B5 | 8.5 | 4.5 |

The invention claimed is:

1. A desulfurization catalyst, comprising:
1) a sulfur-storing metal oxide, wherein the sulfur-storing metal is one or more selected from the group consisting of Group IIB metals, Group VB metals, and Group VIB metals;
2) an inorganic binder that is one or more selected from the group consisting of refractory inorganic oxides;
3) a wear-resistant component that is boron nitride or a combination of boron nitride with a compound other than boron nitride selected from the group consisting of oxides, nitrides, carbides, oxynitrides, carbonitrides, oxycarbides and oxycarbonitrides of an element A, wherein the element A is one or more selected from the group consisting of Group IVB metals, boron, aluminum, and silicon;

4) an active metal component selected from the group consisting of Group VIII metals, oxides of iron-group elements, Group IB metals, oxides of Group IB metals, Group VIIB metals and oxides of Group VIIB metals; and 5) optionally, an acidic porous material selected from the group consisting of molecular sieves and pillared clays.

2. The desulfurization catalyst according to claim 1, wherein the inorganic binder and/or the wear-resistant component are free of silicon.

3. The desulfurization catalyst according to claim 1, wherein the boron nitride in the wear-resistant component has a specific surface area of 100-300 $m^2/g$.

4. The desulfurization catalyst according to claim 1, comprising:

10-80 wt % of the sulfur-storing metal oxide calculated on the basis of sulfur-storing metal oxide, 3-35 wt % of the inorganic binder (calculated on the basis of oxide), 5-40 wt % of the wear-resistant component (on a dry basis, calculated on the basis of the wear-resistant component), 5-30 wt % of the active metal component (calculated on the basis of metal element), and 0-20 wt % of the acidic porous material (on a dry basis), relative to the total weight of the desulfurization catalyst, or relative to the total weight (as 100 wt %) of the components 1) to 5).

5. The desulfurization catalyst according to claim 4, wherein the components of the catalyst are determined after calcination at 650° C. for 4 hours under an air atmosphere.

6. The desulfurization catalyst according to claim 1, wherein the catalyst further comprises an additive selected from the group consisting of alkali metal oxides, clays, rare earth metal oxides, and antimony oxide.

7. A method for the production of a desulfurization catalyst according to claim 1, comprising the steps of:

(1) contacting at least the following components with each other to obtain a catalyst precursor, 1) a sulfur-storing metal oxide or a precursor thereof, wherein the sulfur-storing metal is selected from the group consisting of Group IIB metals, Group VB metals, and Group VIB metals, 2) an inorganic binder or a precursor thereof, wherein the inorganic binder is selected from the group consisting of refractory inorganic oxides, 3) a wear-resistant component or a precursor thereof, wherein the wear-resistant component is boron nitride or a combination of boron nitride with a compound other than boron nitride selected from the group consisting of oxides, nitrides, carbides, oxynitrides, carbonitrides, oxycarbides and oxycarbonitrides of an element A, wherein the element A is selected from the group consisting of Group IVB metals, boron, aluminum and silicon, 4) an active metal component or a precursor thereof, wherein the active metal component is selected from the group consisting of Group VIII metals, oxides of iron-group elements, Group IB metals, oxides of Group IB metals, Group VIIB metals and oxides of Group VIIB metals, 5) optionally, an acidic porous material or a precursor thereof, wherein the acidic porous material is selected from the group consisting of molecular sieves and pillared clays, and 6) a contact medium that is water, an acidic liquid or a combination thereof, wherein the acidic liquid is an acid or an aqueous acid solution;

(2) calcining the catalyst precursor to obtain a desulfurization catalyst, and (3) optionally, reducing the desulfurization catalyst.

8. The method according to claim 7, wherein the step (1) further comprises the steps of:

(1-1) contacting the component 1), the component 2), the component 3), optionally the component 5) and the component 6) with each other to obtain a support slurry, (1-2) calcining the support slurry, optionally after drying, to obtain a catalyst support, and (1-3) contacting the component 4) with the catalyst support to obtain the catalyst precursor.

9. The method according to claim 7, wherein the components are charged at the following relative ratios by weight:

the ratio of the component 1) (calculated on the basis of sulfur-storing metal oxide):the component 2) (calculated on the basis of oxide):the component 3) (on a dry basis, calculated on the basis of the wear-resistant component):the component 4) (calculated on the basis of metal element):the component 5) (on a dry basis, calculated on the basis of acidic porous material):water being (10-80):(3-35):(5-40):(5-30):(0-20):(50-500), and the ratio of the acid:the component 2) (calculated on the basis of oxide) being (0.01-1.0):1.

10. The method according to claim 7, wherein conditions for the calcining include: a calcining temperature of 300-800° C., a calcining time of 0.5 hours or more, and an oxygen-containing atmosphere; or conditions for the reduction include: a reduction temperature of 300-600° C., a reduction time of 0.5-6 hours, and a hydrogen-containing atmosphere.

11. The method according to claim 8, wherein conditions for the drying include: a drying temperature of 25-400° C., and a drying time of 0.5 hours or more; or conditions for the calcining include: a calcining temperature of 400-700° C., a calcining time of 0.5 hours or more, and an oxygen-containing atmosphere.

12. The method according to claim 7, further comprising the step of introducing an additive or a precursor thereof, wherein the additive is one or more selected from the group consisting of alkali metal oxides, clays, rare earth metal oxides, and antimony oxide.

13. A desulfurization method, comprising a step of contacting a sulfur-containing hydrocarbon oil with the desulfurization catalyst according to claim 1 under desulfurization conditions.

14. The desulfurization method according to claim 13, wherein the desulfurization conditions include: a hydrogen atmosphere, a reaction temperature of 350-500° C., reaction pressure of 0.5-4 MPa (absolute pressure), a hydrogen-to-oil ratio by volume of 0.1-0.5, and a mass space velocity of 2-6 $h^{-1}$.

15. A desulfurization method, comprising a step of contacting a sulfur-containing hydrocarbon oil with a desulfurization catalyst according to a desulfurization catalyst obtained by the method according to claim 7 under desulfurization conditions.

16. The desulfurization catalyst according to claim 1, wherein:
- the sulfur-storing metal is selected from the group consisting of zinc, cadmium, niobium, tantalum, chromium, molybdenum, tungsten, and vanadium;
- the inorganic binder is selected from the group consisting of aluminium oxide, silicon oxide, zirconium oxide, titanium oxide and tin oxide;
- the boron nitride is hexagonal phase boron nitride, and the compound other than boron nitride is selected from the group consisting of boron carbide, silicon nitride, silicon carbide, silica, aluminum nitride, aluminum carbide, aluminium oxide, zirconium nitride, zirconium carbide, zirconium oxide, titanium nitride, titanium carbide and titanium oxide;
- the active metal component is selected from the group consisting of iron, iron oxides, cobalt, cobalt oxides, nickel, nickel oxides, copper, copper oxides, manganese and manganese oxides; and
- the acidic porous material is selected from the group consisting of molecular sieves having an IMF structure, molecular sieves having a FAU structure, molecular sieves having a BEA structure, SAPO molecular sieves and molecular sieves having a MFI structure.

17. The desulfurization catalyst according to claim 16, wherein:
- the sulfur-storing metal is selected from the group consisting of zinc, molybdenum, and vanadium;
- the inorganic binder is selected from the group consisting of aluminium oxide, zirconium oxide, titanium oxide and tin oxide;
- the wear-resistant component is hexagonal phase boron nitride;
- the active metal component is selected from the group consisting of nickel, nickel oxides, cobalt, cobalt oxides, and a combination thereof;
- the molecular sieve having an IMF structure is selected from the group consisting of HIM-5 molecular sieves, IM-5 molecular sieves, P-IM-5 molecular sieves and P—Si-IM-5 molecular sieves;
- the molecular sieve having a FAU structure is selected from the group consisting of X molecular sieves, Y molecular sieves, USY molecular sieves, REUSY molecular sieves, REHY molecular sieves, REY molecular sieves, phosphorus-containing USY molecular sieves, PREHY molecular sieves and PREY molecular sieves;
- the molecular sieve having a BEA structure is selected from the group consisting of β molecular sieves,
- the SAPO molecular sieve is selected from the group consisting of SAPO-5 molecular sieves, SAPO-11 molecular sieves, SAPO-31 molecular sieves, SAPO-34 molecular sieves and SAPO-20 molecular sieves; and
- the molecular sieve having a MFI structure is selected from the group consisting of ZSM-5 molecular sieves, ZRP-1 molecular sieves and ZSP-3 molecular sieves.

18. The desulfurization catalyst according to claim 1, comprising:
- 25-70 wt % of the sulfur-storing metal oxide, (calculated on the basis of the sulfur-storing metal oxide) 6-25 wt % of the inorganic binder (calculated on the basis of oxide), 10-30 wt % of the wear-resistant component (on a dry basis, calculated on the basis of the wear-resistant component), 8-25 wt % of the active metal component (calculated on the basis of metal element), and 1-15 wt % of the acidic porous material (on a dry basis), relative to the total weight of the desulfurization catalyst, or relative to the total weight (as 100 wt %) of the components 1) to 5).

19. The desulfurization catalyst according to claim 1, comprising:
- 40-60 wt % of the sulfur-storing metal oxide, (calculated on the basis of the sulfur-storing metal oxide) 8-15 wt % of the inorganic binder (calculated on the basis of oxide), 12-25 wt % of the wear-resistant component (on a dry basis, calculated on the basis of the wear-resistant component), 12-20 wt % of the active metal component (calculated on the basis of metal element), and 2-10 wt % of the acidic porous material (on a dry basis), relative to the total weight of the desulfurization catalyst, or relative to the total weight (as 100 wt %) of the components 1) to 5).

20. The desulfurization catalyst according to claim 6, wherein the alkali metal oxide is selected from the group consisting of sodium oxide and potassium oxide, the rare earth metal in the rare earth metal oxide is selected from the group consisting of La, Ce, Pr, Nd, Pm, Sm, Eu, Gd, Tb, Dy, Ho, Er, Tm, Yb, and Lu.

* * * * *